US012751347B2

(12) United States Patent
Kusakari et al.

(10) Patent No.: US 12,751,347 B2
(45) Date of Patent: Oct. 6, 2026

(54) WORKING VEHICLE

(71) Applicant: Kubota Corporation, Osaka (JP)

(72) Inventors: Yuta Kusakari, Sakai (JP); Sho Watanabe, Sakai (JP); Takanori Morimoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 57 days.

(21) Appl. No.: 18/938,435

(22) Filed: Nov. 6, 2024

(65) Prior Publication Data

US 2025/0143199 A1 May 8, 2025

(30) Foreign Application Priority Data

Nov. 7, 2023 (JP) ................................ 2023-190341

(51) Int. Cl.

| | |
|---|---|
| ***A01B 69/04*** | (2006.01) |
| ***B60K 28/14*** | (2006.01) |
| ***B60R 16/023*** | (2006.01) |
| ***B60W 30/04*** | (2006.01) |

(52) U.S. Cl.

CPC ............ *A01B 69/008* (2013.01); *B60K 28/14* (2013.01); *B60R 16/0233* (2013.01); *B60W 30/04* (2013.01)

(58) Field of Classification Search

None

See application file for complete search history.

(56) References Cited

U.S. PATENT DOCUMENTS

2018/0024563 A1* 1/2018 Matsuzaki ........... G05D 1/0214 701/41
2023/0392350 A1* 12/2023 Gloeckner ................ E02F 9/24
2024/0341214 A1* 10/2024 Friedrick ............. A01B 69/008
2025/0374847 A1* 12/2025 Morimoto ........... A01B 69/008

FOREIGN PATENT DOCUMENTS

| | | | | | |
|---|---|---|---|---|---|
| EP | 3272195 | A1 | | 1/2018 | |
| JP | 4101455 | B2 | | 6/2008 | |
| JP | 2018085960 | A | * | 6/2018 | |
| JP | 2019094035 | A | | 6/2019 | |
| JP | 2019170223 | A | * | 10/2019 | |
| KR | 20170138164 | A | * | 12/2017 | ............ B60W 30/04 |

OTHER PUBLICATIONS

Machine translation of Fujiie et al. (JP-2018085960-A) (Year: 2018).*
Machine translation of Sawaki (JP-2019094035-A) (Year: 2019).*
Machine translation of Miwa (JP-2019170223-A) (Year: 2019).*
Machine translation of Ryu (KR-20170138164-A) (Year: 2017).*
Official Communication issued in corresponding European Patent Application No. 24210772.0, mailed on Apr. 10, 2025, 8 pages.

* cited by examiner

*Primary Examiner* — Navid Z. Mehdizadeh
*Assistant Examiner* — Sarah A. Mueller
(74) *Attorney, Agent, or Firm* — Keating & Bennett, LLP

(57) ABSTRACT

A working vehicle is a working vehicle to perform automatic operation including doing work at an agricultural field using a working device, including a setter configured or programmed to set a first threshold for the automatic operation and a second threshold for remote operation controlled by a remote controller, and a controller configured or programmed to cause the working vehicle to stop traveling if a tilt angle of the working vehicle reaches the first threshold during the automatic operation or the second threshold during the remote operation.

11 Claims, 38 Drawing Sheets

| Border-crossing permission condition | Content |
|---|---|
| First permission condition | Remote control is performed and vehicle speed is lower than prescribed value? |
| Second permission condition | Remote control is performed and received signal strength is equal to or higher than predetermined value? |
| Third permission condition | Remote control is performed and remote controller is within predetermined range from working vehicle? |
| Fourth permission condition | Remote control is performed and working device is not doing work? |
| Fifth permission condition | Remote control is performed and working device is a specific type? |
| Sixth permission condition | Remote control is performed and height of working device is greater than or equal to predetermined height? |
| Seventh permission condition | Remote control is performed and permission is set by user? |

Fig.9

| | Limitation on content of operation in cross-border state | Flag |
|---|---|---|
| When cross-border state is permitted | Limit vehicle speed of working vehicle | ON |
| | Limit acceleration of working vehicle | ON |
| | Limit changing of speed stage of working vehicle | ON |
| | Limit beyond-border range for working vehicle | ON |
| | Limit content of operation of working device | ON |

Fig.10

| | Details of limitation |
|---|---|
| Vehicle speed of working vehicle | Limit vehicle speed to second prescribed speed v2 (< first prescribed speed v1) |
| Acceleration of working vehicle | Limit acceleration to second prescribed acceleration a2 (< first prescribed acceleration a1) |
| Changing of speed stage of working vehicle | Maintain first speed stage (change from first speed stage to higher second speed stage is not allowed) |
| Beyond-border range for working vehicle | Only allow movement within predetermined beyond-border range from borderline |
| Content of operation of working device | Prohibit or limit content of work by working device |

Fig.11

| | Relaxation of limitation |
|---|---|
| Vehicle speed of working vehicle | Less strict third prescribed speed v3 (higher than or equal to second prescribed speed v2 and lower than first prescribed speed v1) |
| Acceleration of working vehicle | Less strict third prescribed acceleration a3 (higher than or equal to second prescribed acceleration a2 and lower than first prescribed acceleration a1) |
| Changing of speed stage of working vehicle | Increase highest set value of first speed range |

Fig.13A

| | Tightening of limitation |
|---|---|
| Vehicle speed of working vehicle | More strict fourth prescribed speed v4<br>(lower than second prescribed speed v2) |
| Acceleration of working vehicle | More strict fourth prescribed acceleration a4<br>(lower than second prescribed acceleration a2) |
| Changing of speed stage of working vehicle | Reduce highest set value of first speed range |

Fig.13B

| Type of operation | Threshold for tilt angle | Changed threshold for tilt angle |
|---|---|---|
| Automatic operation | First threshold $\theta 1$ | Changed first threshold $\theta 11$ ($\lvert\theta 1\rvert < \lvert\theta 11\rvert$) |
| Remote operation | Second threshold $\theta 2$ | Changed second threshold $\theta 21$ ($\lvert\theta 2\rvert < \lvert\theta 21\rvert$) |

$\lvert\theta 1\rvert < \lvert\theta 2\rvert$ (or $\lvert\theta 1\rvert > \lvert\theta 2\rvert$)

Fig.19

| Predetermined condition | Content |
| --- | --- |
| First predetermined condition | Remote control is performed and received signal strength is higher than or equal to predetermined value? |
| Second predetermined condition | Remote control is performed and remote controller is within predetermined range from working vehicle? |
| Third predetermined condition | Remote control is performed, and remote controller is within predetermined range from working vehicle and is located higher than working vehicle on a slope? |
| Fourth predetermined condition | Remote control is performed and working device is a specific type? (specific type = contact type or traveling type) |
| Fifth predetermined condition | Remote control is performed and working device is tilted in front-back direction? |
| Sixth predetermined condition | Remote control is performed and user operation for change is performed? |

Fig.21

| | Limitation on content of operation performed in tilted state | Flag |
|---|---|---|
| When in tilted state | Limit vehicle speed of working vehicle | ON |
| | Limit acceleration of working vehicle | ON |
| | Limit changing of speed stage of working vehicle | ON |
| | Limit steering of working vehicle | ON |
| | Limit content of operation of working device | ON |

Fig.22

| | Limitation on content of operation of working vehicle in tilted state |
|---|---|
| Vehicle speed of working vehicle | Limit vehicle speed to second prescribed speed v2 (< first prescribed speed v1) |
| Acceleration of working vehicle | Limit acceleration to second prescribed acceleration a2 (< first prescribed acceleration a1) |
| Changing of speed stage of working vehicle | Maintain first speed stage (change from first speed stage to second speed stage is not allowed) |
| Steering of working vehicle | Limit steering angle (limit maximum steering angle for when working vehicle is steered such that centrifugal force acts toward lower side of working vehicle on a slope) |
| Content of operation of working device | Prohibit or limit content of work by working device |

Fig.23

WORKING VEHICLE

CROSS REFERENCE TO RELATED APPLICATIONS

This application claims the benefit of priority to Japanese Patent Application No. 2023-190341 filed on Nov. 7, 2023. The entire contents of this application are hereby incorporated herein by reference.

BACKGROUND OF THE INVENTION

1. Field of the Invention

The present invention relates to working vehicles that do agricultural work at an agricultural field.

2. Description of the Related Art

Japanese Unexamined Patent Application Publication No. 2019-94035 discloses an overturn prevention system for a working vehicle. The overturn prevention system includes a tilt angle sensor, a vehicle speed sensor, a position detector, and a controller. The tilt angle sensor detects a tilt angle of the vehicle in the widthwise direction. The vehicle speed sensor detects the vehicle speed. The position detector detects the position of the vehicle. The controller causes the vehicle to travel by automatic operation in accordance with a planned traveling path stored in a storage. The controller sets a predetermined tilt angle to be smaller as the vehicle speed is higher. During automatic operation, the controller executes overturn prevention control to stop the vehicle if the tilt angle becomes larger than or equal to the predetermined tilt angle. The controller does not execute overturn prevention control when the vehicle is operated under manual driving. The controller also executes overturn prevention control when the vehicle is operated under remote operation using a remote controller, as in automatic operation.

SUMMARY OF THE INVENTION

The above-described overturn prevention system for a working vehicle executes overturn prevention control during automatic operation or remote operation. If a working vehicle which has stopped in an oblique orientation due to the execution of overturn prevention control during automatic operation is switched to remote operation, it is unable to perform remote operation because overturn prevention control is still effective. Hence, the operability of remote operation is poor. To handle such a situation, a user needs to get in the working vehicle to move it manually.

Example embodiments of the present invention provide working vehicles each of which achieves good operability while appropriately preventing the overturning of the working vehicle both in automatic operation and remote operation.

A working vehicle according to an example embodiment of the present invention is a working vehicle to perform automatic operation including doing work at an agricultural field using a working device, including a setter configured or programmed to set a first threshold for the automatic operation and a second threshold for remote operation controlled by a remote controller, and a controller configured or programmed to cause the working vehicle to stop traveling if a tilt angle of the working vehicle reaches the first threshold during the automatic operation or the second threshold during the remote operation.

The second threshold may have a greater absolute value than the first threshold.

The first threshold may have a greater absolute value than the second threshold.

The working vehicle may further include a changer configured or programmed to change the second threshold based on a predetermined condition.

The working vehicle may further include a changer configured or programmed to change the first threshold based on a predetermined condition.

The working vehicle may further include a remote-control travel permitter configured or programmed to permit the working vehicle in a tilted state to travel under the remote operation controlled by the remote controller if the tilt angle of the working vehicle is smaller than the changed second threshold changed by the changer.

The predetermined condition may include a condition in which, if a received signal strength of a control signal from the remote controller is higher than or equal to a predetermined value, the changer changes the second threshold such that an absolute value of the second threshold increases, and if the received signal strength of the control signal is lower than the predetermined value, the changer does not change the second threshold.

The predetermined condition may include a condition in which, if the remote controller is positioned within a predetermined range from the working vehicle, the changer changes the second threshold such that an absolute value of the second threshold increases, and if the remote controller is positioned outside the predetermined range from the working vehicle, the changer does not change the second threshold.

The predetermined condition may include a condition in which, if the remote controller is positioned within the predetermined range from the working vehicle and is located higher than the working vehicle on a slope, the changer changes the second threshold such that an absolute value of the second threshold increases, and if the remote controller is positioned within the predetermined range from the working vehicle and is located lower than the working vehicle on a slope, the changer does not change the second threshold.

The changer may be configured or programmed to change the second threshold based on a type of the working device as the predetermined condition.

The predetermined condition may include a condition in which, if the type of the working device is a contact type that does work by contacting a ground, the changer changes the second threshold such that an absolute value of the second threshold increases, and if the type of the working device is a noncontact type that does work without contacting the ground, the changer does not change the second threshold.

The predetermined condition may include a condition in which, if the type of the working device is a traveling type including one or more wheels or one or more crawlers, the changer changes the second threshold such that an absolute value of the second threshold increases, and if the type of the working device is a separation type that has a center of gravity higher than a predetermined position and that does not contact a ground, the changer does not change the second threshold.

The predetermined condition may include a condition in which, if the working device is tilted in a front-back direction, the changer changes the second threshold such that an absolute value of the second threshold increases, and if the working device is tilted in a left-right direction, the changer does not change the second threshold.

The working vehicle may further include a limiter configured or programmed to limit content of an operation of the working vehicle in a tilted state when the working vehicle travels in the tilted state under the remote operation by the remote controller.

The limiter may be configured or programmed to limit at least one of a vehicle speed of the working vehicle in the tilted state, an acceleration of the working vehicle in the tilted state, changing a speed stage of the working vehicle in the tilted state, steering of the working vehicle in the tilted state, or content of an operation of the working device.

The limiter may be configured or programmed to, when limiting the steering of the working vehicle, limit a steering angle of the steering based on the tilt angle of the working vehicle and a travel direction of the working vehicle.

The limiter may be configured or programmed to, when the working vehicle is steered under the remote operation controlled by the remote controller, limit a maximum steering angle for when the working vehicle is steered such that a centrifugal force of the working vehicle acts toward a lower side of the working vehicle on a slope.

The predetermined condition may include a condition in which, if a remote operator performs an operation to change the second threshold, the changer changes the second threshold such that an absolute value of the second threshold increases, and if the remote operator performs an operation to restore the second threshold, the changer restores the second threshold.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 9 illustrates examples of border-crossing permission conditions.

FIG. 10 illustrates examples of limitations on operations of a working vehicle and a working device.

FIG. 11 illustrates examples of details of limitations.

FIG. 13A illustrates examples of the relaxation of limitations.

FIG. 13B illustrates examples of the tightening of limitations.

FIG. 19 illustrates examples of thresholds which are set for respective operation modes.

FIG. 21 illustrates predetermined conditions used in the second example embodiment.

FIG. 22 illustrates examples of limitations on operations of a working vehicle and a working device in the second example embodiment.

FIG. 23 illustrates examples of details of limitations in the second example embodiment.

DETAILED DESCRIPTION OF THE EXAMPLE EMBODIMENTS

Figure 1:
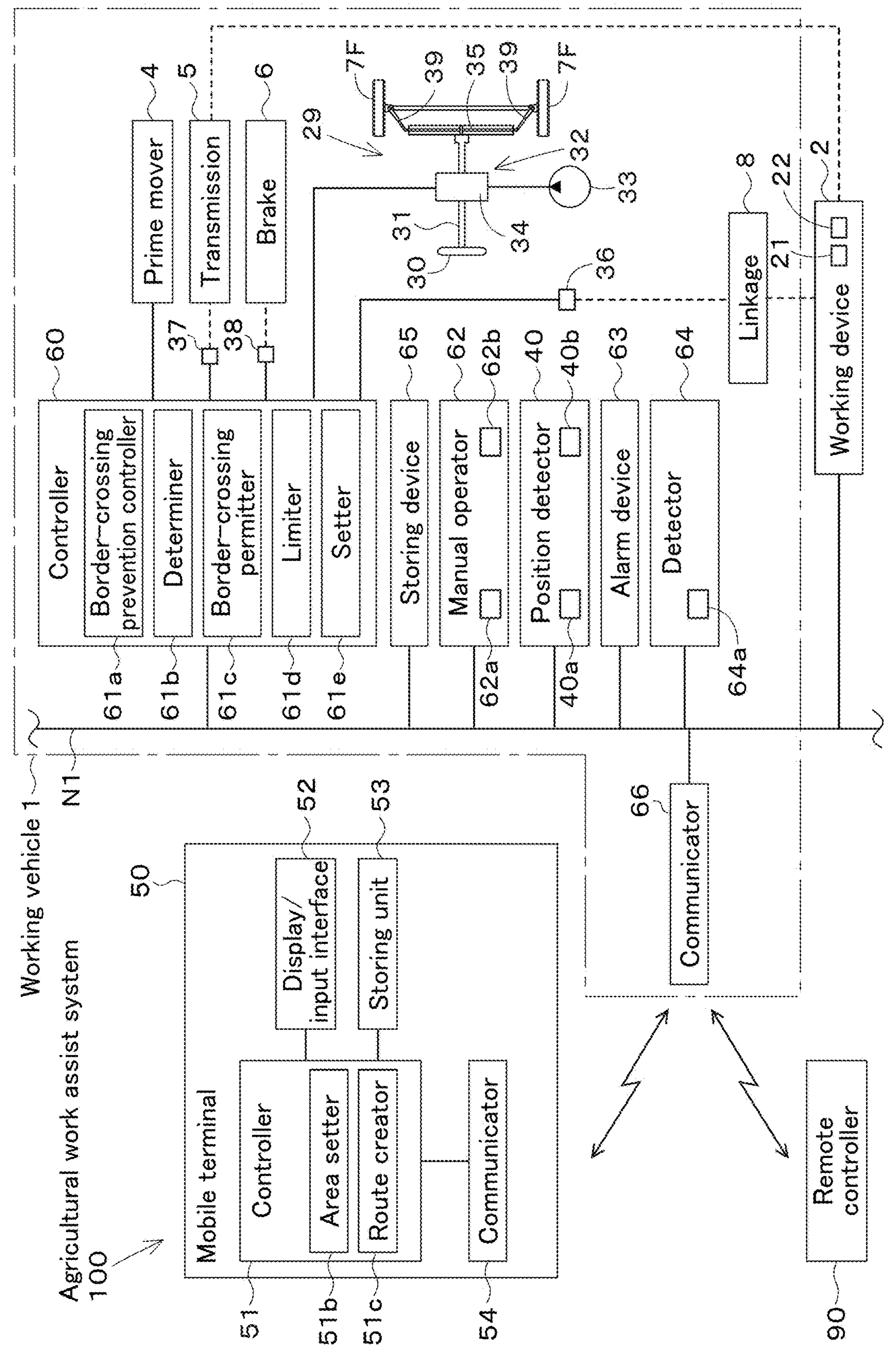
FIG. 1 is a schematic diagram of an agricultural work assist system according to a first example embodiment of the present invention.

Example embodiments will now be described with reference to the accompanying drawings, wherein like reference numerals designate corresponding or identical elements throughout the various drawings. The drawings are to be viewed in an orientation in which the reference numerals are viewed correctly.

Example embodiments of the invention will be described below with reference to the accompanying drawings.

First Example Embodiment

Figure 17:
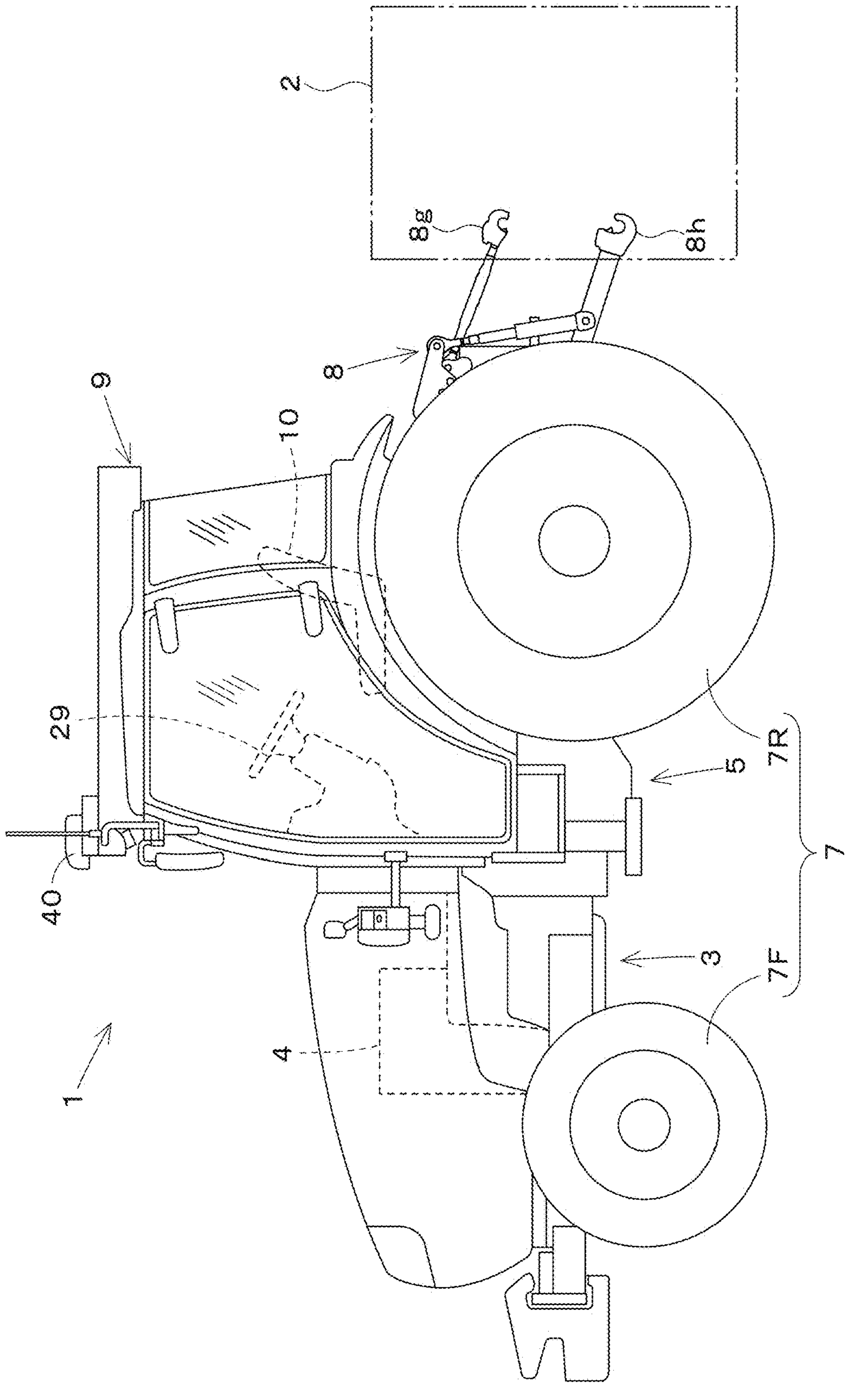
FIG. 17 is a side view of a working vehicle.

First, a working vehicle (agricultural machine) 1 of a first example embodiment will be explained below. FIG. 17 is a side view of a working vehicle. In this example, the working vehicle 1 is a tractor, for example. However, the working vehicle 1 is not limited to a tractor and may be another type of agricultural machine that does agricultural work, such as a rice planter or a combine.

The working vehicle 1 includes a vehicle body 3, a prime mover 4, a transmission 5, and a traveling device 7. Front wheels 7F of the traveling device 7 may be tires or crawlers. Rear wheels 7R of the traveling device 7 may also be tires or crawlers. The prime mover 4 is constituted by a diesel engine or an electric motor, for example. In the first example embodiment, the prime mover 4 is constituted by a diesel engine. The transmission 5 can switch the propelling force of the traveling device 7 by changing the speed stages and can also switch between the forward/backward movements of the traveling device 7. The transmission 5 transmits a driving force of the prime mover 4 to the traveling device 7 to drive it, so that the vehicle body 3 can travel forward or backward. In FIG. 17, the left side of the drawing is the front side as seen from the vehicle body 3, while the right side of the drawing is the rear side as seen from the vehicle body 3. In FIG. 17, the near side of the drawing is the left side as seen from the vehicle body 3, while the far side of the drawing is the right side as seen from the vehicle body 3.

The vehicle body 3 includes a cabin 9. An operator's seat 10 is provided inside the cabin 9. A linkage 8, which is constituted by a three-point linkage, for example, is provided at the rear portion of the vehicle body 3. The linkage 8 couples a working device 2 that does agricultural work to the vehicle body 3. More specifically, by coupling the working device 2 to coupling portions 8*g* and 8*h* provided in the linkage 8, the working device 2 and the vehicle body 3 are coupled to each other, thus enabling the working vehicle 1 to pull the working device 2. That is, the working vehicle 1 can attach the working device 2 thereto.

The working device 2 does ground work for an agricultural field. In this example, the working device 2 includes a cultivator (rotary cultivator) that cultivates an agricultural field, a stubble cultivator that does stubble-cultivating work, a drive harrow that does soil puddling, a spreader that spreads fertilizer or pesticide, a seeder that sows seeds, a seedling transplanter that transplants seedlings, and a harvester that harvests crops.

The working vehicle 1 and an agricultural work assist system 100 according to the first example embodiment will now be described below. FIG. 1 is a schematic diagram of an agricultural work assist system according to the first example embodiment. The agricultural work assist system 100 includes the working vehicle 1, a mobile terminal 50 (mobile terminal device), and a remote controller 90. The agricultural work assist system 100 and the mobile terminal 50 assist in performing agricultural work using the working device 2 while causing the working vehicle 1 to travel in an agricultural field.

The working vehicle 1 includes a controller 60, a manual operator 62, the prime mover 4, the transmission 5, a brake 6, a steering device 29, the linkage 8, a position detector 40, an alarm device 63, a detector 64, a storing device (memory and/or storage) 65, and a communicator 66. In the working vehicle 1, an in-vehicle network N1, such as a local area network (LAN) or a controller area network (CAN), is constructed. The controller 60, manual operator 62, position detector 40, alarm device 63, detector 64, storing device 65, and communicator 66 are connected to the in-vehicle network N1. These elements of the working vehicle 1 are included in the agricultural work assist system 100. The communicator 66 is constituted by a communication circuit that wirelessly communicates with the mobile terminal 50.

The controller 60 is constituted by electrical/electronic circuits, a processor, and a memory, for example. Examples of the processor are a central processing unit (CPU), a graphics processing unit (GPU), a digital signal processor (DSP), a field programmable gate array (FPGA), and an application specific integrated circuit (ASIC). The memory of the controller 60 includes a volatile memory and a nonvolatile memory. The controller 60 controls the operations of the individual elements of the working vehicle 1. The manual operator 62 is constituted by a switch, a lever, a pedal, and other elements, such as keys, which can be operated by the operator sitting in the operator's seat 10 or a user (operator) located near the working vehicle 1.

The storing device 65 is a nonvolatile memory, for example, and stores various control programs (such as a prevention program, a determination program, a permission program, a limitation program, and a setting program), and various pieces of data. The storing device 65 is a hard disk drive (HDD) or a solid state drive (SSD), for example.

The manual operator 62 includes a mode switch 62*a* and a raising/lowering operation lever 62*b*. The mode switch 62*a* is an operation member for switching the mode of the working vehicle 1. The raising/lowering operation lever 62*b* is an operation member operated by a user to change the raising/lowering height of the working device 2 to determine the position of the working device 2 and maintain it.

The modes of the working vehicle 1 that can be selected by the mode switch 62*a* include an automatic traveling working mode and an automatic steering working mode. The automatic traveling working mode is a mode for allowing the working device 2 to do agricultural work (ground work) while causing the working vehicle 1 (vehicle body 3) to travel under automatic operation. Executing automatic operation for the working vehicle 1 means automatically changing the traveling speed of the vehicle body 3 and automatically steering the vehicle body 3. The automatic steering working mode is a mode for allowing the working device 2 to do agricultural work (ground work) while automatically steering the vehicle body 3.

When the working vehicle 1 is in the automatic steering working mode, the operator of the working vehicle 1 operates an accelerator member or a braking member included in the manual operator 62 to change the traveling speed of the vehicle body 3 in accordance with the operation. That is, in the automatic steering working mode, the traveling speed of the vehicle body 3 is changed based on a manual operation.

The working vehicle 1 can also travel by manual driving and can also do ground work by using the working device 2 while manually traveling. Manual driving for the working vehicle 1 is executed as follows. The operator operates the accelerator member or the braking member of the manual operator 62 to change the traveling speed of the vehicle body 3 and also operates a steering wheel 30 to steer the vehicle body 3. In this case, the working vehicle 1 is in a manual mode. The working vehicle 1 is in the manual mode if it is not in the automatic traveling working mode, the automatic steering working mode, or a remote operation mode, which will be discussed later.

Driving, stopping, and the revolutions per minute (RPM) of the prime mover 4 (engine) are controlled by the controller 60. The transmission 5 is connected to a control valve 37. The control valve 37 is a solenoid valve that is actuated based on a control signal sent from the controller 60. A hydraulic fluid delivered from a hydraulic pump 33 is supplied to the control valve 37. Although the control valve

37 is represented by a single block in FIG. 1, a suitable number of control valves 37 are provided in accordance with the number of hydraulic pressure units, such as hydraulic clutches or hydraulic cylinders, provided in the transmission 5.

The brake 6 is connected to a control valve 38. The control valve 38 is a solenoid valve that is actuated based on a control signal sent from the controller 60. A hydraulic fluid delivered from the hydraulic pump 33 is supplied to the control valve 38. The controller 60 actuates the brake 6 by electrically controlling the switching position and the opening of the control valve 38 so as to apply the brakes to the vehicle body 3.

The controller 60 electrically adjusts the switching position (the opening) of the control valve 37 to control the driving of the transmission 5. The transmission 5 transmits a driving force of the prime mover 4 to the traveling device 7 so as to actuate it, thus causing the vehicle body 3 to travel forward or backward. Additionally, when the working device 2 does ground work, for example, the transmission 5 transmits a driving force of the prime mover 4 to the working device 2, thus increasing the actuation force of the working device 2.

The controller 60 communicates with the working device 2 via the in-vehicle network N1. This will be discussed more specifically. The working device 2 includes a controller 21 and a communicator 22. The controller 60 sends a working command to the working device 2 via the in-vehicle network N1. Upon receiving this working command via the communicator 22, the controller 21 of the working device 2 controls the operations of the individual elements of the working device 2 based on the working command so as to do agricultural work (ground work). The controller 21 also sends information or data indicating the working state, for example, to the controller 60 by using the communicator 22 via the in-vehicle network N1. The controller 60 detects, for example, the working state of the working device 2 based on the information or the data received from the working device 2 via the in-vehicle network N1.

A certain type of working device 2 may include neither the controller 21 nor the communicator 22. If such a type of working device 2 is used, the controller 60 does not communicate with the working device 2 via the in-vehicle network N1, but it changes the position of the working device 2 by causing the linkage 8 to raise and lower the working device 2, which will be discussed later, so as to control the operation of the working device 2 and also detects certain information on the working device 2, such as the working state.

The steering device 29 includes a steering wheel 30, a steering shaft (rotating shaft) 31, and an assist mechanism (power steering mechanism) 32. The steering wheel 30 is provided inside the cabin 9 (FIG. 17). The steering shaft 31 is rotated in accordance with the rotation of the steering wheel 30. The assist mechanism 32 assists the steering wheel 30 in steering.

The assist mechanism 32 includes a control valve 34 and a steering cylinder 35. The control valve 34 is a solenoid valve that is actuated based on a control signal sent from the controller 60. More specifically, the control valve 34 is constituted by a three-position switch valve that can switch its position by the movement of a spool, for example. A hydraulic fluid delivered from the hydraulic pump 33 is supplied to the control valve 34. The controller 60 electrically controls the switching position and the opening of the control valve 34 to adjust the amount of hydraulic fluid to be supplied to the steering cylinder 35 so as to extend and retract the steering cylinder 35. The steering cylinder 35 is connected to knuckle arms 39 that change the orientation of the front wheels 7F.

The position and the opening of the control valve 34 can also be switched by the steering of the steering shaft 31. More specifically, operating the steering wheel 30 rotates the steering shaft 31 to switch the switching position and the opening of the control valve 34. The steering cylinder 35 extends and retracts leftward or rightward of the vehicle body 3 in accordance with the switching position and the opening of the control valve 34. The extension and retraction of the steering cylinder 35 changes the steering direction of the front wheels 7F. The above-described steering device 29 is only an example and is not limited to the above-described configuration.

The working vehicle 1 can execute manual steering via manual operation of the steering wheel 30 and also execute automatic steering using the controller 60. In response to a manual operation performed on an accelerator member or a brake pedal (neither of which is shown) included in the manual operator 62, the transmission 5 or the brake 6 is actuated to start or stop the vehicle body 3. In response to the controller 60 controlling the transmission 5 or the brake 6, the vehicle body 3 can automatically start or stop traveling. The controller 60 controls the control valve 34 to extend and retract the steering cylinder 35 to change the steering direction of the front wheels 7F via the knuckle arms 39. That is, the working vehicle 1 can execute manual driving by a user (operator) performing a traveling operation and a steering operation, automatic operation by the controller 60 performing automatic traveling and steering, and auto steering control (also called automatic steering control or semi-automated driving) by the controller 60 performing automatic steering and by a user performing a traveling operation.

Figure 2:
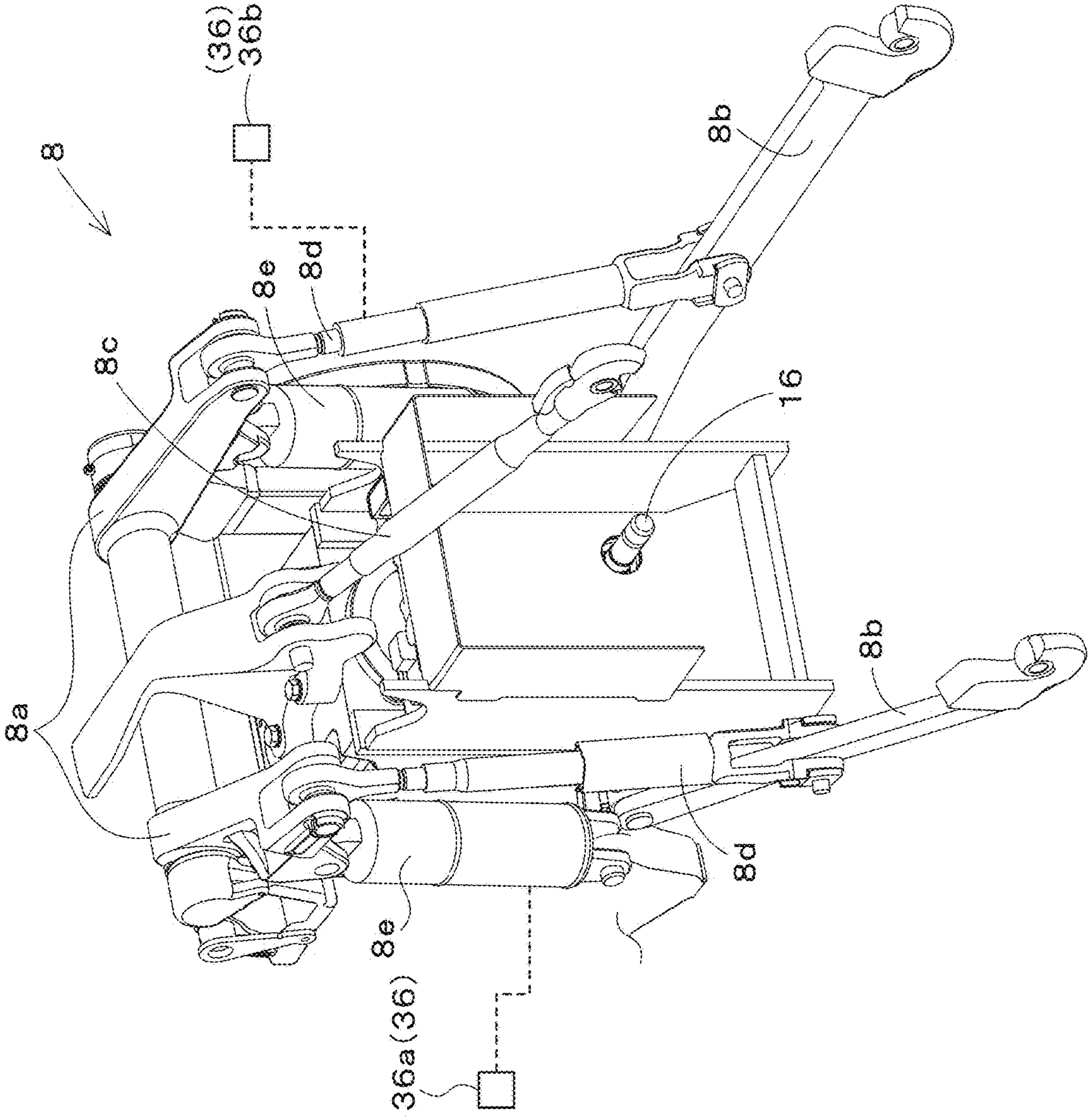
FIG. 2 is a perspective view of a linkage.

FIG. 2 is a perspective view of the linkage 8. The linkage 8 includes lift arms 8*a*, lower links 8*b*, a top link 8*c*, lift rods 8*d*, and lift cylinders 8*e*. The front end portions of the lift arms 8*a* are supported by the top rear portion of a case (transmission case) for storing the transmission 5 so that the lift arms 8*a* can pivot upward or downward. Driving the lift cylinders 8*e* pivots (raises and lowers) the lift arms 8*a*. The lift cylinders 8*e* are constituted by hydraulic cylinders. The lift cylinders 8*e* are connected to a control valve 36 (FIG. 1). The control valve 36 is a solenoid valve that is actuated based on a control signal sent from the controller 60. A hydraulic fluid delivered from the hydraulic pump 33 is supplied to the control valve 36.

The front end portions of the lower links 8*b* are supported by the bottom rear portion of the transmission 5 (FIGS. 1 and 17) so that the lower links 8*b* can pivot upward or downward. At a position higher than the lower links 8*b*, the front end portion of the top link 8*c* is pivotably supported by the rear portion of the transmission 5. The lift rods 8*d* couple the lift arms 8*a* and the lower links 8*b* with each other. The coupling portions 8*g* and 8*h* that can couple the working device 2 to the vehicle body 3 are provided at the rear end portions of the lower links 8*b* and the top link 8*c*.

The control valve 36 illustrated in FIG. 1 includes control valve portions 36*a* and 36*b* shown in FIG. 2. The controller 60 (FIG. 1) electrically controls the switching position or the opening of the control valve portion 36*a* to adjust the amount of hydraulic fluid to be supplied to the lift cylinders 8*e* so as to extend and retract the lift cylinders 8*e*. The extension and retraction of the lift cylinders 8*e* raises and lowers the lift arms 8*a* and also raises and lowers the lower links 8*b* coupled to the lift arms 8*a* via the lift rods 8*d*. With this operation, the working device 2 pivots upward or downward (rises or lowers) about the front portions of the lower links 8*b* (opposite side on which the coupling portions 8*g* and 8*h* are provided).

The controller 60 controls the prime mover 4, transmission 5, brake 6, traveling device 7, steering device 29, and linkage 8 so as to cause the working device 2 to do agricultural work for an agricultural field while automatically moving or steering the working vehicle 1. More specifically, the controller 60 executes automatic operation to cause the working device 2 to do agricultural work while causing the working vehicle 1 to travel automatically. The controller 60 also executes automatic steering (auto steering) to cause the working device 2 to do agricultural work for an agricultural field while automatically steering the working vehicle 1 and letting a user (operator) manually change the traveling speed of the working vehicle 1.

The position detector 40 shown in FIG. 1 includes a receiver 40*a* and an inertial measurement unit (IMU) 40*b*. The receiver 40*a* receives satellite signals indicating the positions of positioning satellites, transmission times, and correction information, for example, sent from satellite positioning systems (positioning satellites), such as Differential Global Positioning System (D-GPS), GPS, Global Navigation Satellite System (GLONASS), BeiDou (Chinese navigation satellite system), Galileo, and Michibiki (Japanese navigation satellite system). The position detector 40 detects a current position (latitude and longitude, for example) of the working vehicle 1 based on satellite signals received by the receiver 40*a*. That is, the position detector 40 is a position detector to detect the position of the working vehicle 1 (vehicle body 3). The IMU 40*b* includes an acceleration sensor and a gyroscope sensor, for example. The IMU 40*b* detects the roll angle, pitch angle, and yaw angle of the vehicle body 3, for example. The alarm device 63 is constituted by a buzzer, a speaker, or a warning light, for example, provided in the vehicle body 3. The alarm device 63 outputs an alarm or a warning to the surroundings of the vehicle body 3 by sound or light.

The detector 64 includes sensors and cameras provided at some portions of the working vehicle 1 and the working device 2, and an electrical circuit that processes an output signal from a sensor or a camera. The detector 64 detects the operation states (such as driving states, stopping states, and operation positions) of the individual elements of the working device 2, such as the transmission 5, brake 6, traveling device 7, linkage 8, steering device 29, and manual operator 62, based on the output signals from the sensors, for example. The detector 64 also detects the operation state of the working device 2 based on the output signals from the sensors, for example. The detector 64 also includes an object detector 64*a* (object detection sensor), such as a LiDAR or an ultrasonic sensor. The object detector 64*a* is installed at the front portion, rear portion, and left and right side portions of the vehicle body 3. The object detector 64*a* detects the presence or the absence of an object around the working vehicle 1 and the distance to an object, for example.

The mobile terminal 50 is constituted by a tablet terminal or a smartphone, for example. The mobile terminal 50 is carried by a user and is taken out of the working vehicle 1 or is installed at a certain position of the cabin 9 of the working vehicle 1. That is, the mobile terminal 50 can be operated outside the working vehicle 1 and also inside the working vehicle 1. "Outside the working vehicle 1" does not necessarily mean a location outside the cabin 9, and means a position, a unit, or a device other than the working vehicle 1, and a position, a unit, or a device other than the working vehicle 1 may be located near the working vehicle 1 or may be far away from the working vehicle 1.

The mobile terminal 50 includes a controller 51, a display/input interface 52, a storing unit (storage and/or memory) 53, and a communicator 54. The controller 51 is constituted by a CPU (or a microcomputer), a volatile memory, and a nonvolatile memory. The controller 51 controls the individual elements of the mobile terminal 50. The controller 51 includes an area setter 51*b* and a route creator 51*c*. In this example, the area setter 51*b* and the route creator 51*c* include a software program, but they may include hardware, such as a semiconductor element (ASIC, for example) or an electrical circuit, in another example.

The display/input interface 52 is constituted by a touchscreen and displays various pieces of information on a screen. A user can perform a certain operation on a display screen of the display/input interface 52 so as to input various pieces of information. The display/input interface 52 serves as a display, an operation unit, and an input unit. Instead of the display/input interface 52, a display and an operation unit (input unit), which are independent devices, may be provided in the mobile terminal 50. Information indicating a predetermined alarm is displayed on the display/input interface 52 and is output. Alternatively, sound, voice, or light indicating a predetermined alarm may be output from the alarm device 63.

The storing unit 53 is constituted by a nonvolatile memory, for example. In the storing unit 53, information or data for the traveling of the working vehicle 1 and for assisting the working device 2 in doing agricultural work is stored so as to be readable and writable into and from the storing unit 53. The communicator 54 is constituted by an electrical circuit or a semiconductor element for communicating with the communicator 66 or the controller 60. More specifically, when the mobile terminal 50 is located outside the working vehicle 1, the communicator 54 and the communicator 66 wirelessly communicate with each other. If the mobile terminal 50 is installed in the cabin 9 of the working vehicle 1 (in the working vehicle 1) and is electrically connected to the in-vehicle network N1 by a cable, for example, the communicator 54 and the controller 60 may communicate with each other via a wired medium.

After the mobile terminal 50 is started, as a result of a user performing a certain operation on a screen displayed on the display/input interface 52, various pieces of information, such as information on an agricultural field H, the working vehicle 1, and/or the working device 2, working conditions for doing agricultural work in the agricultural field H using the working vehicle 1 and the working device 2, and information for automatically driving the working vehicle 1, are input into the mobile terminal 50. Then, when the user performs a certain operation on the display/input interface 52 to set the above-described input content, the area setter 51*b* sets a given area on a map showing the agricultural field H, and the route creator 51*c* creates a travel route of the working vehicle 1 on this map.

Figure 3:
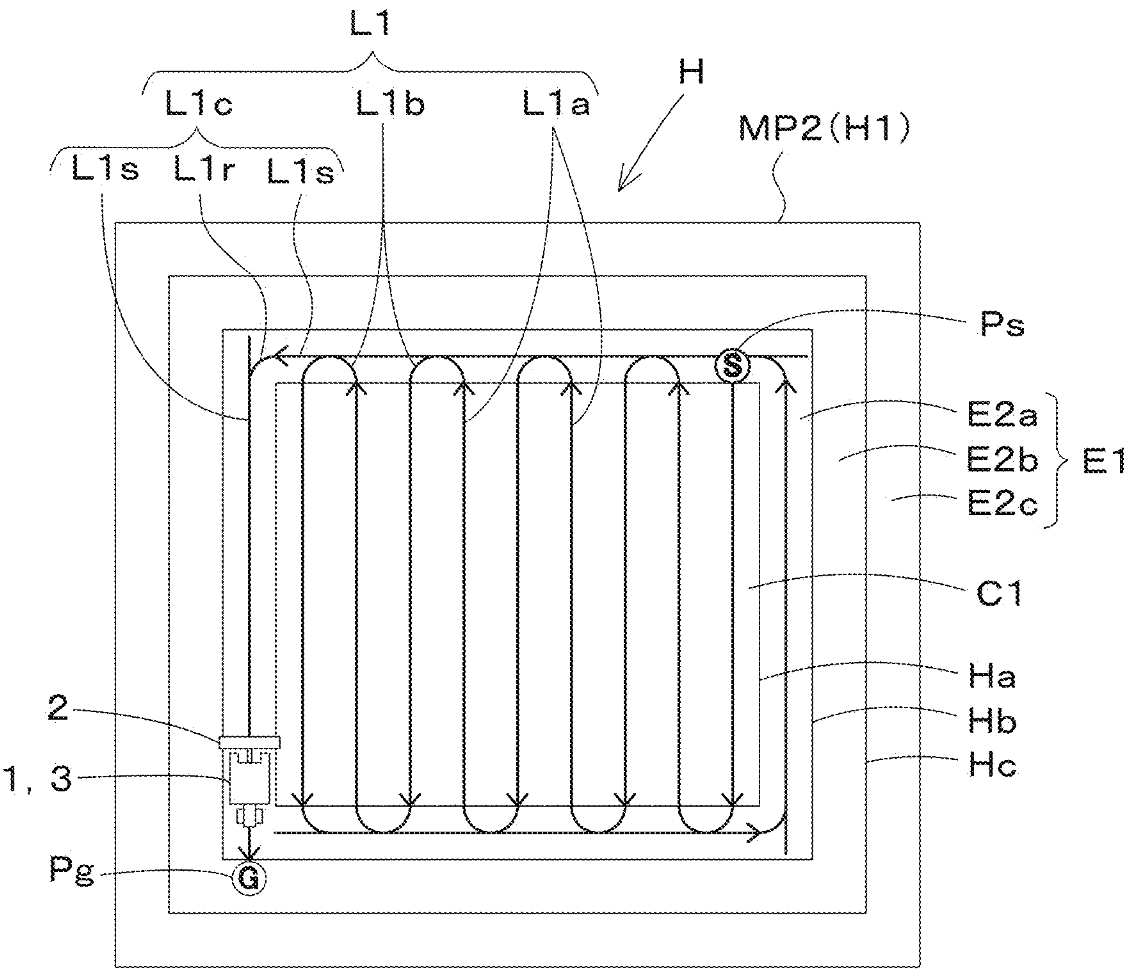
FIG. 3 illustrates an example of a travel route.

FIG. 3 illustrates an example of a travel route L1 created by the route creator 51*c*. The area setter 51*b* (FIG. 1) sets a central area C1 and a headland area E1 on an agricultural field map MP2, as illustrated in FIG. 3, based on position information (latitude and longitude, for example) of the agricultural field H, dimension information of the working device 2, and working conditions, for example. More specifically, for example, the area setter 51*b* calculates contours Hc, Hb, and Ha in the following manner. The contour H1 of the agricultural field His shifted inward the same number of times as the number of headlands (for example, three in FIG.

3) by an amount equal to the dimension obtained by subtracting the overlapping portion of adjacent headlands from the working width of the working device 2. As a result, the contours Hc, Hb, and Ha are calculated. The area setter 51*b* then sets the area (central portion) surrounded by the contour Ha, which is provided most inwardly, to be the central area C1. The area setter 51*b* also sets a frame-like area (outer portion) located outward of the central area C1 and inward of the counter H1 of the agricultural field H to be the headland area E1. By using the contour H1 of the agricultural field H and the contours Hc, Hb, and Ha, which are calculated by shifting the contour H1, in the headland area E1, the area setter 51*b* sets the areas located between adjacent contours to be headlands E2*a*, E2*b*, and E2*c*. That is, the area between the contours H1 and Hc is the headland E2*c*, the area between the contours Hb and Hc is the headland E2*b*, and the area between the contours Ha and Hb is the headland E2*a*. If the number of headlands is set to one, the headland area E1 only has the headland E2*c*, and the area (central portion) surrounded by the contour Hc is set to be the central area C1.

The route creator 51*c* (FIG. 1) creates the travel route L1 on the agricultural field map MP2, based on position information of the agricultural field H, central area C1, headland area E1, dimension information of the working vehicle 1 and the working device 2, working conditions, and/or automatic operation information, for example. More specifically, the route creator 51*c* divides the central area C1 into multiple unit working sections starting from one end (right end in FIG. 3) of the central area C1 as viewed from a direction parallel with the working direction (top-down direction in FIG. 3) by an amount equal to the dimension obtained by subtracting the overlapping portion of the central portion, which is indicated by the working conditions, from the working width of the working device 2. Then, the route creator 51*c* creates straight routes L1*a* on the center lines of the individual unit working sections as seen from a preset dimension (left-right direction in FIG. 3). The vehicle body 3 travels by following these straight routes L1*a*. Then, the route creator 51*c* creates turning routes L1*b* which link adjacent straight routes L1*a* in the headland area E1. The turning route L1*b* is a route heading from one straight route L1*a* to another adjacent straight route L1*a*. When creating the turning routes L1*b*, the route creator 51*c* secures turning spaces in the headland area E1 to allow the working vehicle 1 and the working device 2 to turn.

In FIG. 3, the simple semicircular turning routes L1*b* are shown by way of example. However, this shape is merely for some convenience, such as easy representation on the display screen of the display/input interface 52 and easy visibility of the travel route L1 on the display screen. In actuality, the working vehicle 1 may draw a more complicated path than a semicircular shape. For example, after the vehicle body 3 of the working vehicle 1 and the working device 2 travel based on a straight route L1*a*, the vehicle body 3 may, not only move forward, but also move backward or change its position and direction before heading to another straight route L1*a*. That is, the turning routes L1*b* are merely for display on the display/input interface 52, and the working vehicle 1 does not necessarily turn based on the turning routes L1*b*.

While the vehicle body 3 is traveling based on the straight routes L1*a*, the controller 60 (FIG. 1) of the working vehicle 1 causes the linkage 8 (FIG. 2) to lower the working device 2 to a working position P1 to do ground work. When the controller 60 causes the vehicle body 3 to turn at a location corresponding to a turning route L1*b*, that is, to turn to head from one straight route L1*a* to another, it causes the linkage 8 to raise the working device 2 to a non-working position P2 to stop doing ground work. The straight route L1*a* is a working route where the working device 2 does ground work while the vehicle body 3 of the working vehicle 1 is traveling under automatic operation. The central area C1 where multiple straight routes L1*a* are provided is a working area where the working device 2 does ground work while the vehicle body 3 is traveling straight and reciprocating.

Additionally, for example, if doing work in the central area C1 and the headland E2*a*, which is located closest to the central area C1, is input as a working condition, in addition to the straight routes L1*a* and the turning routes L1*b*, the route creator 51*c* creates in the headland area E1 a circulating route L1*c* where the vehicle body 3 goes around the exterior of the central area C1. The circulating route L1*c* is a working route where the working device 2 does ground work while the vehicle body 3 of the working vehicle 1 is traveling under automatic operation. The circulating route L1*c* includes substantially straight routes L1*s* and turning routes L1*r* that are curved at a predetermined radius of curvature or larger. Multiple straight routes L1*s* are provided on the center lines of the headland E2*a* in its dimensions so as to correspond to the individual straight lines of a contour Ha of the central area C1.

The turning route L1*r* is a route heading from one straight route L1*s* to another adjacent straight route L1*s* in its extending direction. Although the extending direction of one straight route L1*s* and that of its adjacent straight route L1*s* are different, the terminating end of one straight route L1*s* and the leading end of the other straight route L1*s* are connected to each other by the turning route L1*r*. When creating the turning routes L1*r*, as well as creating the turning routes L1*b*, the route creator 51*c* secures turning spaces in the headland area E1 to allow the vehicle body 3 of the working vehicle 1 and the working device 2 to turn.

In FIG. 3, the simple arch-like turning routes L1*r* are shown by way of example. In actuality, however, the working vehicle 1 may draw a more complicated path than the arch-like shape when heading from one straight route L1*s* to another. For example, the working vehicle 1 may, not only move forward, but also move backward or change its position and direction before heading to another straight route L1*s*. That is, the turning routes L1*r* are merely for display on the display/input interface 52, and the working vehicle 1 does not necessarily turn based on the turning routes L1*r*.

After creating the circulating route L1*c*, between the two ends of each of the two straight routes L1*a* located at both sides of the central area C1 (left and right sides in FIG. 3), the route creator 51*c* sets a start position Ps at one end of the straight route L1*a* which is not connected to the turning route L1*b* (top end of the straight route L1*a* on the right side in FIG. 3) and connects the circulating route L1*c* to an end of the other straight route L1*a* (bottom end of the straight route L1*a* on the left side in FIG. 3). The route creator 51*c* also sets a goal position Pg in the end of the circulating route L1*c* which is not connected to any straight route L1*a*. The route creator 51*c* then stores individual pieces of information indicating the central area C1, headland area E1, travel route L1, start position Ps, goal position Pg, and turning spaces in the internal memory as route information.

Upon completion of the creation of the travel route L1 using the route creator 51*c*, the controller 51 causes the display/input interface 52 to display the route information indicating the agricultural field map MP2, central area C1, headland area E1, travel route L1, start position Ps, and goal position Pg. Then, as a result of a user performing a predetermined operation using the display/input interface 52, the controller 51 causes the display/input interface 52 to display a travel control screen D8 shown in FIG. 4. The controller 51 also generates automatic travel data based on setting information stored in the internal memory and sends (outputs) the automatic travel data to the controller 60 of the working vehicle 1 via the communicator 54.

The automatic travel data includes certain pieces of information, such as route information, setting information of the working vehicle 1 and the working device 2, and automatic operation information. Information indicating the travel route L1 included in the route information may include information on the positions of the working routes L1*a* and L1*s* but may not necessarily include information on the positions of the turning routes L1*b* and L1*r*. The setting information of the working vehicle 1 and the working device 2 include dimension information of the working vehicle 1 and the working device 2 and the type of agricultural work to be done by the working device 2, for example.

Figure 4:
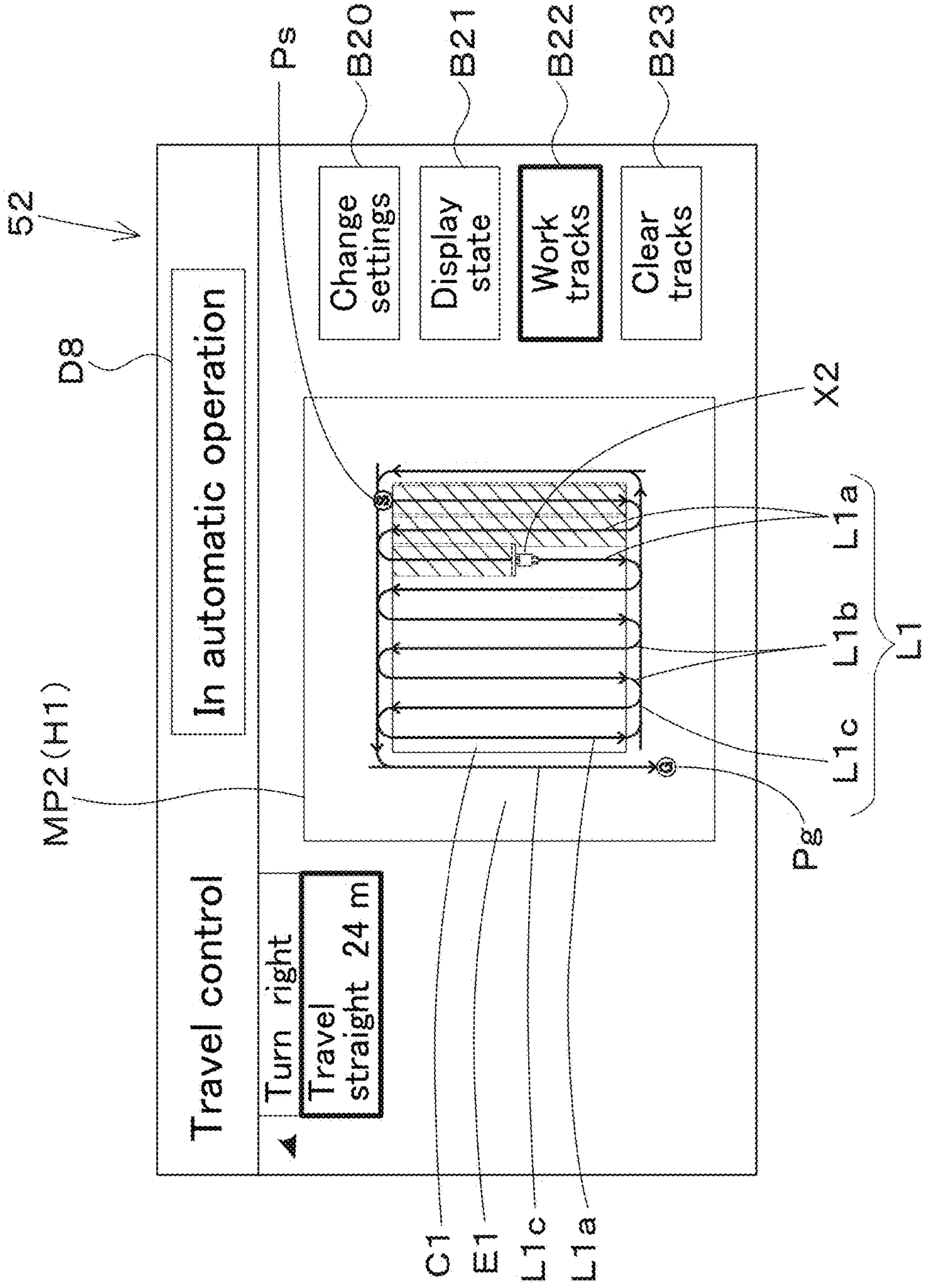
FIG. 4 illustrates an example of a travel control screen.

The travel control screen D8 illustrated in FIG. 4 is a screen for displaying the traveling state of the working vehicle 1 and the working state of the working device 2 in the automatic traveling working mode. In FIG. 4, the traveling state of the working vehicle 1 and the working state of the working device 2 after a certain lapse of time after the automatic traveling working mode is started are shown on the travel control screen D8. On the travel control screen D8, the agricultural field map MP2, the travel route L1, the start position Ps, the goal position Pg, an agricultural machine mark X2, the traveling state of the working vehicle 1, a setting change key B20, a state display key B21, a working tracks key B22, and a tracks clear key B23 are shown. The controller 51 regularly obtains the position of the vehicle body 3 detected by the position detector 40 via the communicator 54 and displays the agricultural machine mark X2 at a certain position of the agricultural field map MP2 corresponding to the actual position of the vehicle body 3. That is, the agricultural machine mark X2 on the travel control screen D8 indicates the actual position of the vehicle body 3 of the working vehicle 1.

For example, while looking at the travel control screen D8, a user manually moves the working vehicle 1 to the start position Ps and then performs a predetermined operation for shifting the mode of the working vehicle 1 to the automatic traveling working mode by using the mode switch 62*a* (FIG. 1). This shifts the controller 60 to the automatic traveling working mode and starts automatic operation for the working vehicle 1 and causes the working device 2 to do ground work while the vehicle body 3 is traveling under automatic operation, based on automatic travel data received from the mobile terminal 50 and the position of the vehicle body 3 detected by the position detector 40.

This will be explained more specifically. The controller 60 first reads route information included in the automatic travel data and recognizes the central area C1, headland area E1, travel route L1 (working routes L1*a* and L1*s*), start position Ps, and goal position Pg. Then, the controller 60 causes the working device 2 to do ground work while causing the vehicle body 3 to travel under automatic operation starting from the start position Ps, based on the straight routes L1*a* of the travel route L1. When the vehicle body 3 (working vehicle 1) reaches the terminating end of one straight route L1*a*, the controller 60 temporarily stops the ground work of the working device 2 and raises it, and then turns the vehicle body 3 to the leading end of an adjacent straight route L1*a*. That is, the controller 60 turns the working vehicle 1 and the working device 2 at a location corresponding to a turning route L1*b*. At this time, the controller 60 turns the working vehicle 1 and the working device 2, based on certain pieces of information, such as position information of the central area C1 and the headland area E1, position information of the straight routes L1*a*, dimension information of the working vehicle 1 and the working device 2, the position of the vehicle body 3 detected by the position detector 40, and detection results of the detector 64.

When the vehicle body 3 reaches the leading end of the other straight route L1*a*, the controller 60 lowers the working device 2 and causes it to restart ground work at a timing at which the vehicle body 3 starts to travel under automatic operation based on this straight route L1*a*. With this operation, the vehicle body 3 can reciprocate straight in the central area C1 under automatic operation and the working device 2 can do ground work for the central area C1.

Thereafter, based on the circulating route L1*c* and the position of the vehicle body 3, the controller 60 causes the working device 2 to do ground work while the vehicle body 3 is traveling under automatic operation. In this case, based on the straight routes L1*s*, the controller 60 causes the working device 2 to do ground work while the vehicle body 3 is traveling under automatic operation, and when turning the vehicle body 3 at a location corresponding to a turning route L1*r*, the controller 60 raises the working device 2 and causes it to stop doing the ground work. When turning the vehicle body 3, the controller 60 turns the working vehicle 1 and the working device 2, based on certain pieces of information, such as position information of the central area C1 and the headland area E1, position information of the straight routes L1*s*, dimension information of the working vehicle 1 and the working device 2, position of the vehicle body 3 detected by the position detector 40, and detection results of the detector 64. As a result, the vehicle body 3 circulates around the exterior of the central area C1 under automatic operation, while the working device 2 does ground work for the headland E2*a* (FIG. 3) surrounding the central area C1.

Figure 5A:
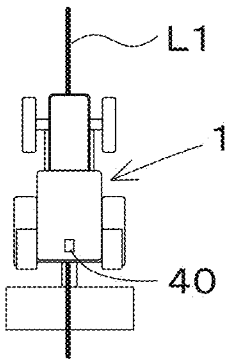
FIG. 5A illustrates the execution of automatic operation of a working vehicle.
Figure 5B:
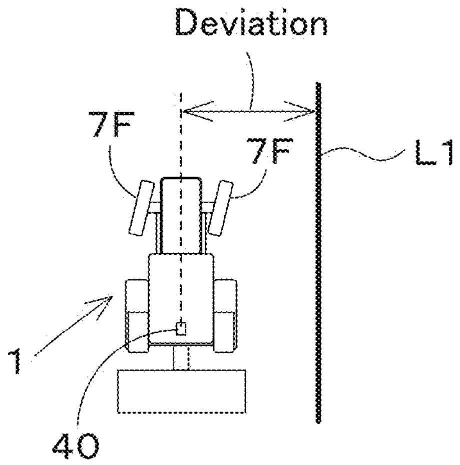
FIG. 5B illustrates the execution of automatic operation of a working vehicle.
Figure 5C:
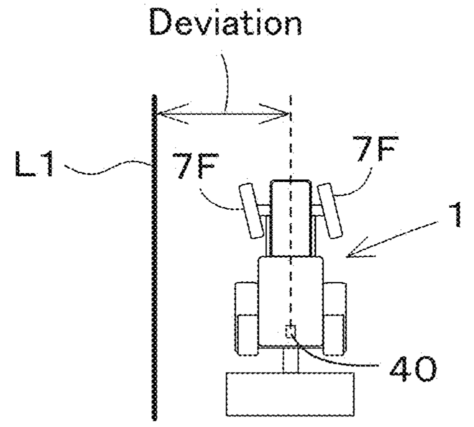
FIG. 5C illustrates the execution of automatic operation of a working vehicle.
Figure 5D:
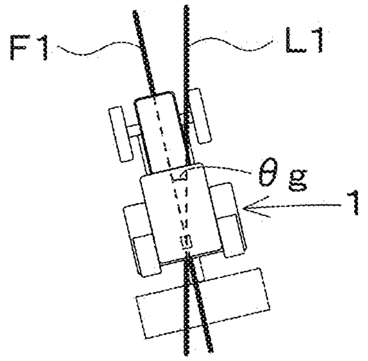
FIG. 5D illustrates the execution of automatic operation of a working vehicle.

FIGS. 5A through 5D illustrate the execution of automatic steering of the working vehicle 1. In the automatic traveling working mode, the controller 60 calculates a deviation of the position of the vehicle body 3 detected by the position detector 40 from the travel route L1 (working routes L1*a* and L1*s*) while causing the vehicle body 3 to travel under automatic operation. If the deviation is smaller than a threshold (FIG. 5A, for example), the controller 60 maintains the rotation angle of the steering shaft 31 (FIG. 1). If the deviation is greater than or equal to the threshold and if the vehicle body 3 is positioned toward the left side with respect to the travel route L1 (FIG. 5B, for example), the controller 60 rotates the steering shaft 31 to change the steering direction of the vehicle body 3 to the right direction. If the deviation is greater than or equal to the threshold and if the vehicle body 3 is positioned toward the right side with respect to the travel route L1 (FIG. 5C, for example), the controller 60 rotates the steering shaft 31 to change the steering direction of the vehicle body 3 to the left direction. The above-described operation is only an example and does not limit the automatic steering method of the working vehicle 1. For example, as illustrated in FIG. 5D, the steering shaft 31 may be rotated such that the angle θg between the heading F1 of the vehicle body 3 and the travel route L1 is within a predetermined range.

The controller 60 also calculates the actual speed of the vehicle body 3 based on a change in the position of the vehicle body 3 while the vehicle body 3 is traveling under automatic operation based on the travel route L1. The controller 60 then controls the driving of the transmission 5, brake 6, and prime mover 4 so that the actual speed of the vehicle body 3 matches (or substantially matches) the vehicle speed associated with the straight routes L1*a*, turning routes L1*b*, or circulating route L1*c*.

As discussed above, in the automatic traveling working mode of the working vehicle 1, the controller 60 automatically steers the vehicle body 3 while automatically changing the speed of the vehicle body 3 based on the travel route L1 and the position of the vehicle body 3 (working vehicle 1). The controller 60 also automatically starts or stops agricultural work (ground work) of the working device 2.

The working vehicle 1 can execute remote operation as a result of a user (remote operator) performing a certain operation on the remote controller 90. That is, the working vehicle 1 can enter the remote operation mode. Based on a control signal from the remote controller 90, the controller 60 controls the transmission 5 and the brake 6 to remotely start and stop the vehicle body 3, and controls the control valve 34 to extend and retract the steering cylinder 35 so as to change the steering direction of the front wheels 7F using the knuckle arms 39. That is, the working vehicle 1 implements remote operation to perform a remote-control travel operation and a remote-control steering operation, based on a control signal output from the remote controller 90 in response to the operation of a user (operator).

Figure 6:
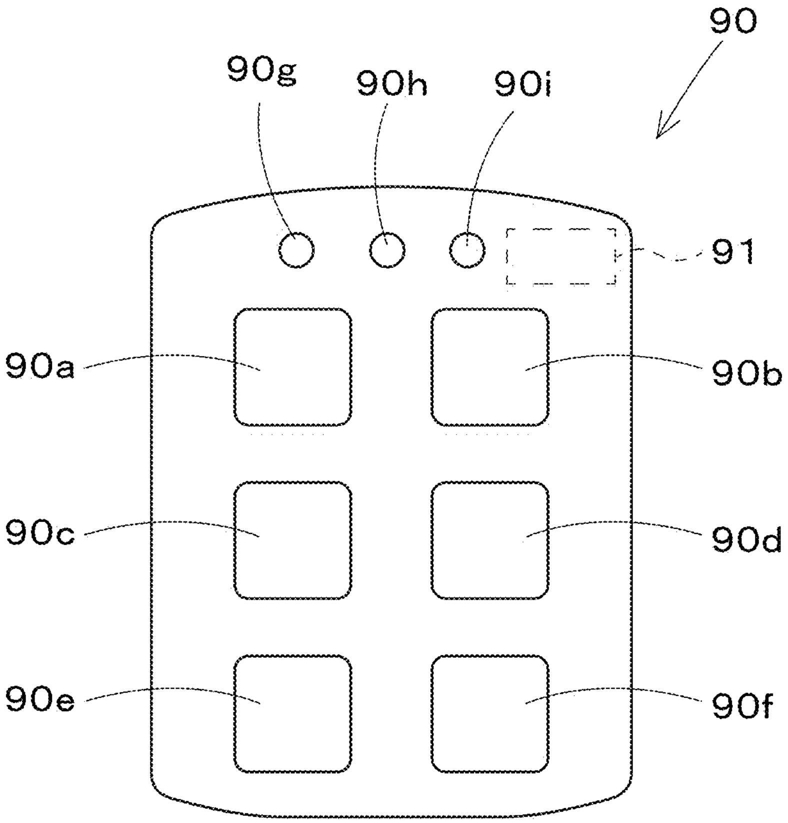
FIG. 6 is a plan view illustrating an example of a remote controller.

As illustrated in FIG. 6, the remote controller 90 is a small manual operator that can be held by a user and can communicate with the communicator 66 of the working vehicle 1. The remote controller 90 is a remote control, for example, and includes a communicator 91. The communicator 91 is a communicator that performs near field communication with the communicator 66 of the working vehicle 1. The remote controller 90 includes six buttons (first through sixth buttons 90*a* through 90*f*) and three indicators (first through third indicators 90*g* through 90*i*), for example. The number of buttons may be other than six and the number of indicators may be other than three.

The sixth button 90*f* is a function button. When the sixth button 90*f* is long-pressed, the remote controller 90 is powered ON. When the sixth button 90*f* is short-pressed twice, the remote controller 90 outputs a remote operation start signal to cause the working vehicle 1 to enter the remote operation mode. When the sixth button 90*f* is short-pressed twice while the remote controller 90 is ON, the remote controller 90 outputs a remote operation stop signal to cancel the remote operation mode of the working vehicle 1. When the sixth button 90*f* is long-pressed while the remote controller 90 is ON, the remote controller 90 is powered OFF.

The first button 90*a* is a button for moving the working vehicle 1 forward when it is pressed together with the sixth button 90*f*. When the first button 90*a* is pressed together with the sixth button 90*f*, the remote controller 90 sends a forward movement signal to the working vehicle 1 in the remote operation mode and causes it to move forward under remote control.

The second button 90*b* is a button for moving the working vehicle 1 backward when it is pressed together with the sixth button 90*f*. When the second button 90*b* is pressed together with the sixth button 90*f*, the remote controller 90 sends a backward movement signal to the working vehicle 1 in the remote operation mode and causes it to move backward under remote control.

The third button 90*c* is a button for turning the working vehicle 1 to the left side when it is pressed together with the sixth button 90*f*. When the third button 90*c* is pressed together with the sixth button 90*f*, the remote controller 90 sends a left turning signal to the working vehicle 1 in the remote operation mode and turns it to the left side under remote control. When the third button 90*c* has stopped being pressed, the remote controller 90 sends a left turning stop signal to the working vehicle 1 in the remote operation mode and stops turning the working vehicle 1 to the left side.

The fourth button 90*d* is a button for turning the working vehicle 1 to the right side when it is pressed together with the sixth button 90*f*. When the fourth button 90*d* is pressed together with the sixth button 90*f*, the remote controller 90 sends a right turning signal to the working vehicle 1 in the remote operation mode and turns it to the right side under remote control. When the fourth button 90*d* has stopped being pressed, the remote controller 90 sends a right turning stop signal to the working vehicle 1 in the remote operation mode and stops turning the working vehicle 1 to the right side.

The fifth button 90*e* is a button for stopping the working vehicle 1 when it is pressed together with the sixth button 90*f*. When the fifth button 90*e* is pressed together with the sixth button 90*f*, the remote controller 90 sends a stop signal to the working vehicle 1 in the remote operation mode and stops the working vehicle 1. For example, the working vehicle 1 in the remote operation mode stops moving forward or moving backward.

When the first button 90*a*, third button 90*c*, and sixth button 90*f* are pressed together, the remote controller 90 sends a working start signal to the working vehicle 1 in the remote operation mode and causes it to start operating the working device 2 under remote control. When the second button 90*b*, fourth button 90*d*, and sixth button 90*f* are pressed together, the remote controller 90 sends a working stop signal to the working vehicle 1 in the remote operation mode and causes it to stop operating the working device 2 under remote control.

The first indicator 90*g* indicates the remaining battery charge while the remote controller 90 is powered ON, and changes the display color from green to red if the remaining battery charge is running short. The second indicator 90*h* indicates the communication status with the working vehicle 1. The display color of the second indicator 90*h* is green when the communication status is good, while the display color is red when communication with the working vehicle 1 is not established. The display color of the third indicator 90*i* is green when the working vehicle 1 is in the remote operation mode, while the third indicator 90*i* is turned OFF when the working vehicle 1 is not in the remote operation mode. The display color of the third indicator 90*i* is red if an abnormality has occurred in the working vehicle 1.

The above-described operations of the first through sixth buttons 90*a* through 90*f* are only examples and do not limit their operations. The operations of the first through sixth buttons 90*a* through 90*f* may be other than those described above. The number of buttons may be more than or less than six. The above-described display contents of the first through third indicators 90*g* through 90*i* are only examples and do not limit their display contents. The display contents of the first through third indicators 90*g* through 90*i* may be other than those described above. The number of indicators may be more than or less than three.

The controller 60 includes a border-crossing prevention controller 61*a*, a determiner 61*b*, a border-crossing permitter 61*c*, and a limiter 61*d*. The border-crossing prevention controller 61*a* prohibits the working vehicle 1 from traveling beyond a borderline BD of the agricultural field H. The determiner 61*b* determines whether or not to permit a cross-border state in which the working vehicle 1 remotely operated by the remote controller 90 crosses the borderline BD. The border-crossing permitter 61*c* permits the cross-border state if the determiner 61*b* determines to permit the cross-border state. The limiter 61*d* limits the content of operation of the working vehicle 1 in the cross-border state. The determiner 61*b* may determine whether or not to permit the cross-border state in which the working vehicle 1, switched from automatic operation to remote operation controlled by the remote controller 90, crosses the borderline BD.

For example, the foregoing processor of the controller 60 executes prevention program(s), determination program(s), permission program(s), and limitation program(s) stored in the storing device 65 to function as the border-crossing prevention controller 61*a*, the determiner 61*b*, the border-crossing permitter 61*c*, and the limiter 61*d*.

The storing device 65 stores in advance the agricultural field map MP2 including position information (latitude and longitude, for example) of the agricultural field H, position information of borderline BD of the agricultural field H, and position information a position-short-of-border FP located at a position short of the borderline BD. That is, the agricultural field map MP2 includes position information of the agricultural field H, position information of the borderline BD, and position information of the position-short-of-border FP. For example, in the agricultural field H on the agricultural field map MP2 shown in FIG. 3, the borderline BD of the agricultural field H and the position FP short of the borderline BD are preset, as illustrated in FIG. 7A.

For example, the controller 51 of the mobile terminal 50 sets, as the borderline BD, a line displaced inward from the contour H1 of the agricultural field H by a predetermined distance (first set value indicating a predetermined distance). The controller 51 also sets, as the position-short-of-border FP, a line displaced inward from the borderline BD by a predetermined distance (second set value indicating a predetermined distance). The controller 51 may set the borderline BD and the position-short-of-border FP, based on an instruction provided by a user operation. The borderline BD is set in the headland E2*c* of the headland area E1, for example, but may be set at another location.

The position FP short of the borderline BD is a position closer to the central area C1 than the borderline BD by a predetermined distance. The position-short-of-border FP is set at a position at which the working vehicle 1 can stop before crossing the borderline BD when it is determined that none of border-crossing permission conditions, which will be discussed later, are satisfied. The position-short-of-border FP may be set at a different position in accordance with the speed of the working vehicle 1 moving toward the borderline BD in the headland area E1. That is, the position-short-of-border FP is set to have a greater value as the speed of the working vehicle 1 increases. For example, the position-short-of-border FP is set when the speed of the working vehicle 1 is a first set speed, and the position-short-of-border FP approaches the central area C1 as the speed of the working vehicle 1 increases from the first set speed.

Figure 7A:
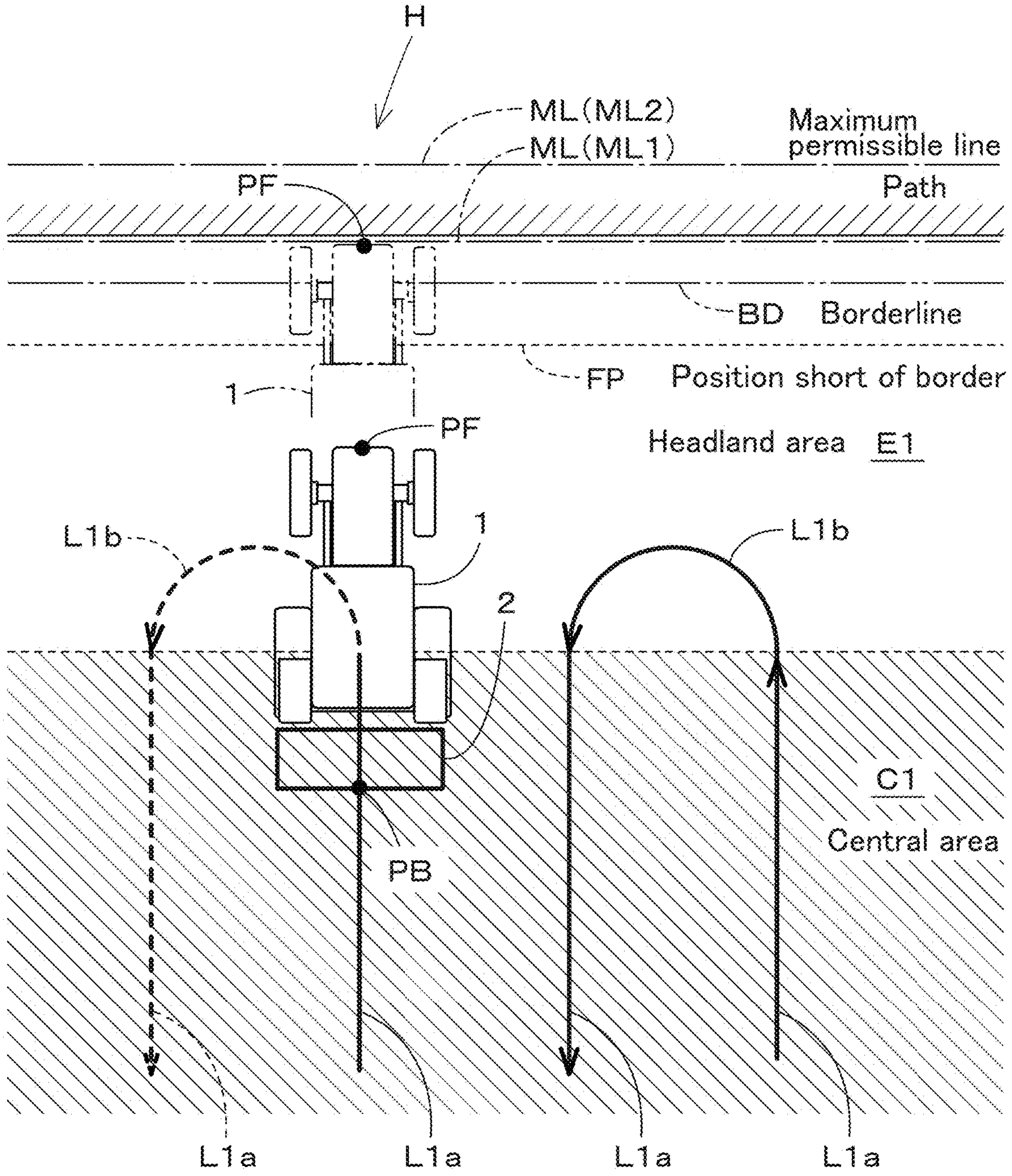
FIG. 7A illustrates that a working vehicle is crossing a borderline of an agricultural field.

The determiner 61*b* determines whether or not to permit the cross-border state when the position of the working vehicle 1 (the front side position PF of the working vehicle 1 shown in FIG. 7A when the working vehicle 1 is moving forward and the back side position PB of the working vehicle 1 shown in FIG. 7A when the working vehicle 1 is moving backward) detected by the position detector 40 is located at the position-short-of-border FP short of the borderline BD stored in the storing device 65. For example, if the speed of the working vehicle 1 is lower than a prescribed value, the determiner 61*b* determines to permit the cross-border state, and if the speed of the working vehicle 1 is higher than or equal to the prescribed value, the determiner 61*b* determines to not permit the cross-border state. The front side position PF shown in FIG. 7A can be calculated as a position obtained by shifting the installation position of the position detector 40 by the distance from the installation position to the front edge of the working vehicle 1. The back side position PB shown in FIG. 7A can be calculated as a position obtained by shifting the installation position of the position detector 40 by the distance from the installation position to the rear edge of the working vehicle 1.

The determiner 61*b* may determine to permit the cross-border state if the received signal strength of a control signal from the remote controller 90 is higher than or equal to a predetermined value, and to not permit the cross-border state if the received signal strength is lower than the predetermined value. The received signal strength of a control signal from the remote controller 90 becomes weaker as the remote controller 90 is separated from the working vehicle 1 by a greater distance. If the remote controller 90 is located within a certain range of the working vehicle 1, a control signal from the remote controller 90 can be received by the communicator 66 of the working vehicle 1 at a received signal strength indicating the predetermined value or higher.

The determiner 61*b* may determine to permit the cross-border state if the position indicated by position information of the remote controller 90 is within a predetermined range (first range r1, for example) and to not permit the cross-border state if the position is in a range outside the predetermined range (second range r2 outside the first range r1, for example). In this case, the remote controller 90 includes a position detector that can detect the position of the remote controller 90, and the communicator 91 sends the position information of the remote controller 90 to the working vehicle 1. The determiner 61*b* can thus make the above-described determination.

The determiner 61*b* may determine to permit the cross-border state if the working device 2 is not doing work and to not permit the cross-border state if the working device 2 is doing work. For example, the determiner 61*b* can make a determination regarding whether the working device 2 is doing work, based on the operation state of the working device 2 detected by the detector 64.

The determiner 61*b* determines whether or not to permit the cross-border state based on the type of working device 2. If the working device 2 is a noncontact type that does work without contacting the ground, the determiner 61*b* may determine to permit the cross-border state. If the working device 2 is a contact type that does work by contacting the ground, the determiner 61*b* may determine to not permit the cross-border state. The determiner 61*b* determines whether or not to permit the cross-border state based on the height of the working device 2.

The determiner 61*b* may determine whether or not to permit the cross-border state upon detection of switching to a remote control. For example, as discussed above, when the sixth button 90*f* is short-pressed twice, the remote controller 90 outputs a remote operation start signal and the working vehicle 1 enters the remote operation mode. When the working vehicle 1 has entered the remote operation mode or when a remote operation start signal is received from the remote controller 90, the determiner 61*b* may assume that the working vehicle 1 has switched to a remote control and determine whether the working vehicle 1 is allowed to be in the cross-border state. In this configuration, the determiner 61*b* does not make any special determination other than detecting whether the working vehicle 1 has switched to a remote control. This can reduce the load for determination processing and thus allows for more smooth determination.

The limiter 61*d* limits at least one of the speed, the acceleration, or changing of the speed stage of the working vehicle 1 in the cross-border state, the beyond-border range for the working vehicle 1, or the content of operation of the working device 2.

The controller 60 also includes a setter 61*e* to make a setting to permit or not permit the cross-border state in accordance with a user selection. For example, the foregoing processor of the controller 60 executes setting program(s) stored in the storing device 65 to function as the setter 61*e*. If permitting the cross-border state is set by the setter 61*e*, the determiner 61*b* determines to permit the cross-border state. If not permitting the cross-border state is set by the setter 61*e*, the determiner 61*b* determines not to permit the cross-border state.

Figure 8A:
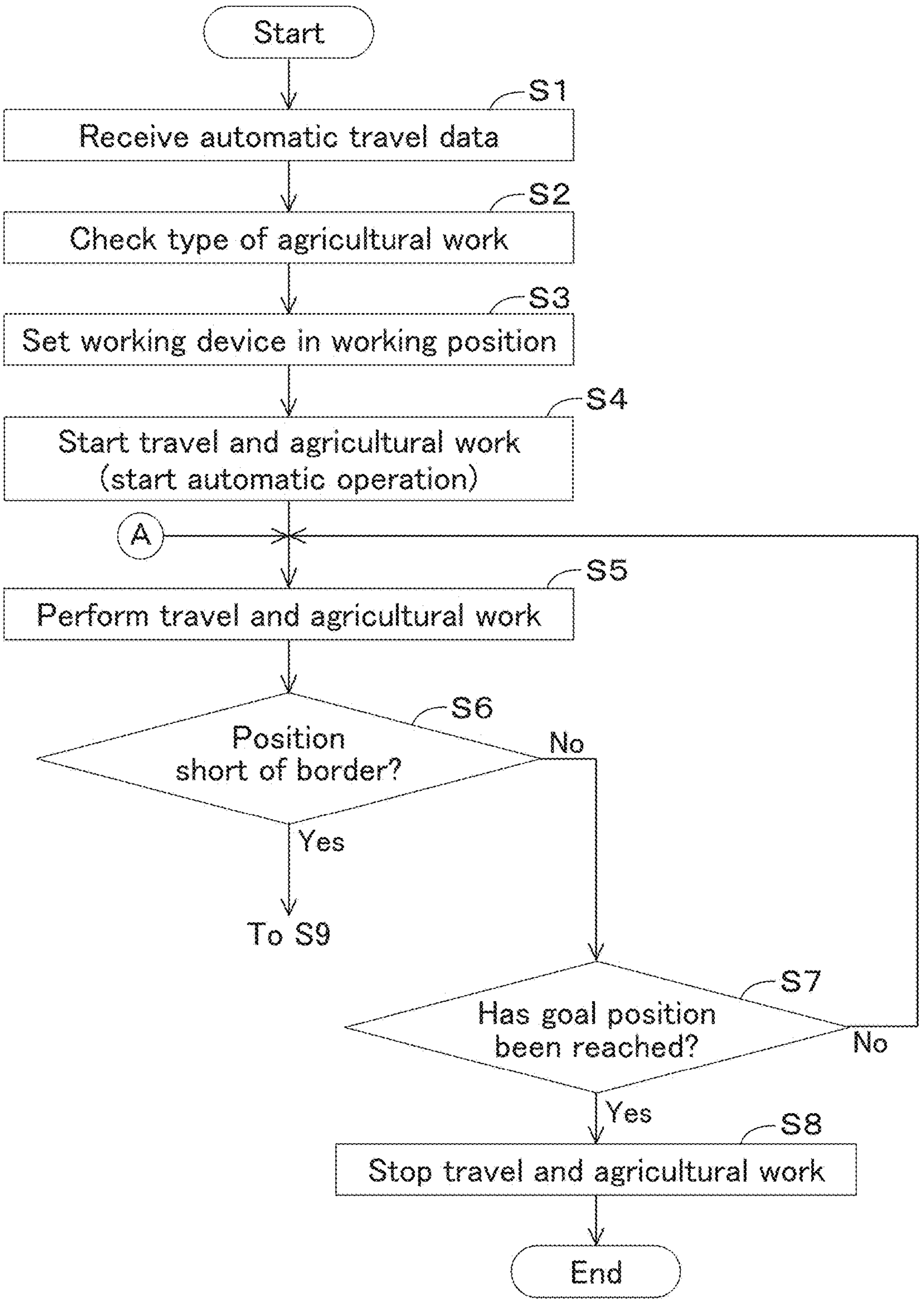
FIG. 8A is a first part of a flowchart illustrating an example of the operation of a working vehicle.
Figure 8B:
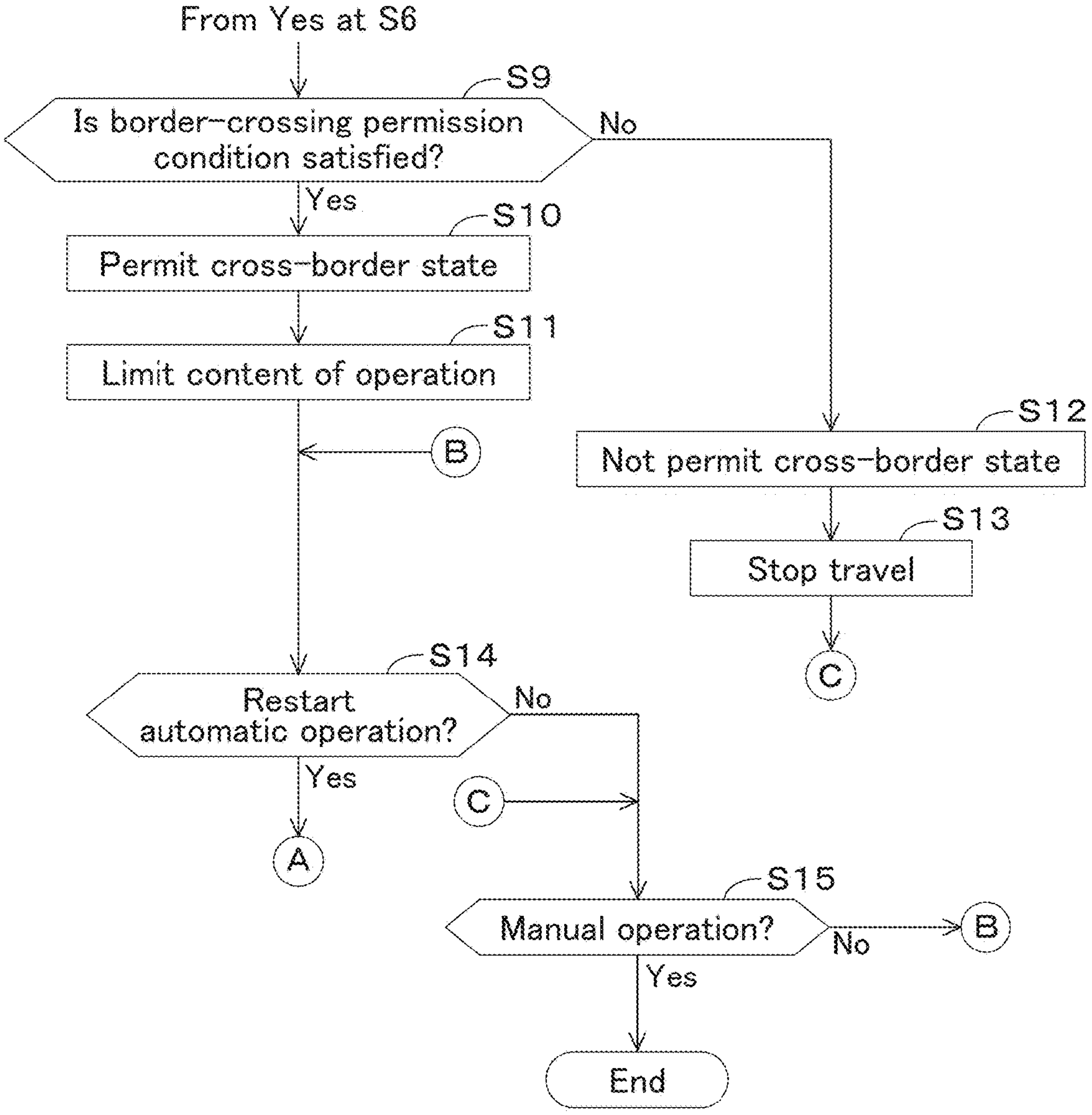
FIG. 8B is a second part of the flowchart continuing from FIG. 8A.

FIGS. 8A and 8B are a flowchart illustrating an example of the operation of a working vehicle.

In the working vehicle 1, the controller 60 receives automatic travel data sent from the communicator 54 of the mobile terminal 50 in step S1, and then, it checks (reads) the type of agricultural work indicated by the automatic travel data in step S2. In step S2, the controller 60 may detect the type of agricultural work to be done by the working device 2 from the type of working device 2 indicated by the automatic travel data. In step S3, in accordance with the checked type of agricultural work, the controller 60 sets the working device 2 at a predetermined working position P1, P3, or P5 for doing agricultural work by using the linkage 8 (raising/lowering device).

Figure 14A:
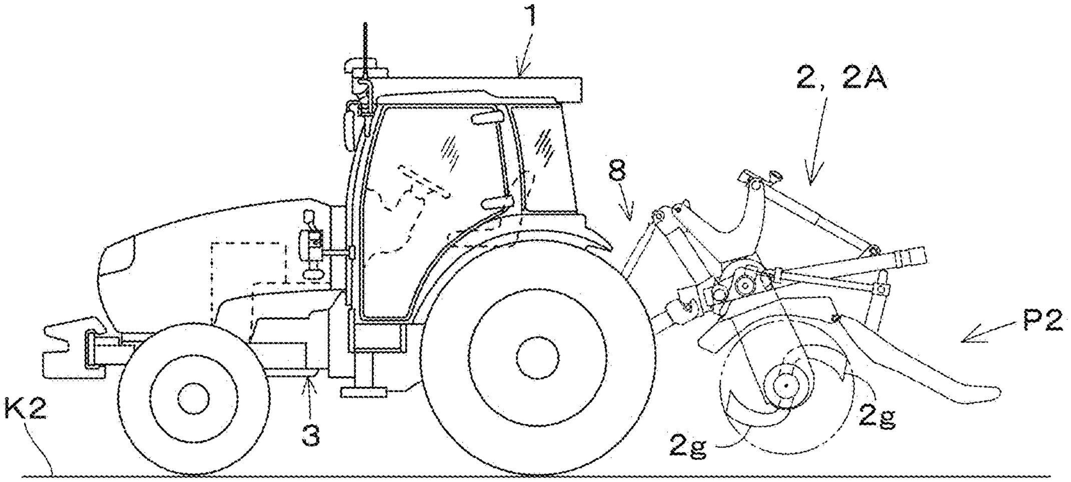
FIG. 14A illustrates an example of the raising/lowering height of a cultivator coupled to an agricultural machine.
Figure 14B:
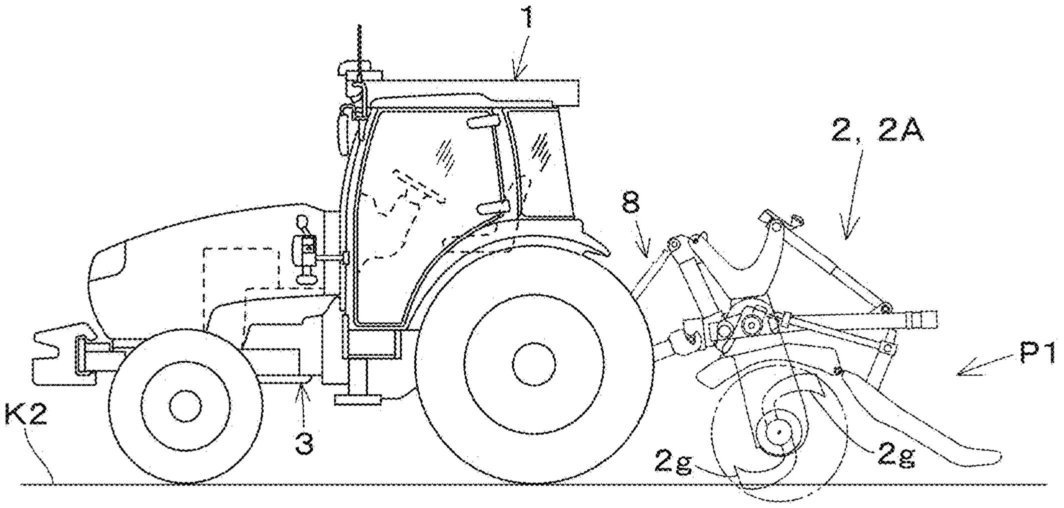
FIG. 14B illustrates an example of the raising/lowering height of a cultivator coupled to an agricultural machine.

As illustrated in FIGS. 14A and 14B, if the working device 2 coupled to the working vehicle 1 is a cultivator 2A, as illustrated in FIG. 14B, the controller 60 causes the linkage 8 to lower the cultivator 2A to bring a cultivation tine 2*g* of the cultivator 2A into contact with the soil K2 of the agricultural field H so as to set the cultivator 2A at the working position P1 at which the cultivator 2A can do cultivating work. The controller 60 causes the linkage 8 to further lower the cultivator 2A or causes the cultivator 2A to insert the cultivation tine 2*g* deep into the soil K2, thus increasing the cultivation depth of the cultivator 2A to the agricultural field H. The controller 60 also causes the linkage 8 to raise the cultivator 2A or the cultivator 2A to raise the cultivation tines 2*g*, thus decreasing the cultivation depth of the cultivator 2A to the agricultural field H. When carrying the cultivator 2A, for example, as illustrated in FIG. 14A, the controller 60 causes the linkage 8 to raise the cultivator 2A to separate the cultivation tines 2*g* from the soil K2, thus setting the cultivator 2A at the non-working position P2 at which the cultivator 2A is prevented from doing cultivating work. That is, the controller 60 adjusts the raising/lowering height of the working device 2 by using the linkage 8 or the working device 2.

Figure 15:
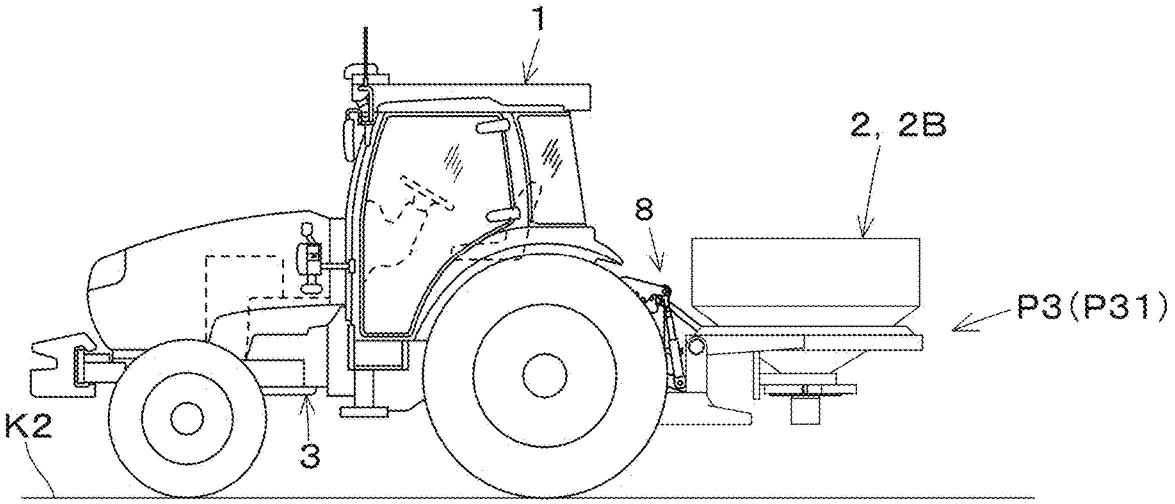
FIG. 15 illustrates an example of a working position and a non-working position of a spreader.

If the type of agricultural work is spreading of fertilizer or pesticide, for example, and if the working device 2 coupled to the working vehicle 1 is a spreader 2B, as illustrated in FIG. 15, the controller 60 uses the linkage 8 (raising/lowering device) to set the spreader 2B at the working position P3 at which the spreader 2B is separated from the soil K2 of the agricultural field H regardless of whether or not the spreader 2B does spreading work. That is, in the example in FIG. 15, the working position P3 at which the spreader 2B does spreading work and a non-working position P31 at which the spreader 2B does not do spreading work are the same position at the same height from the soil K2. In another example, the working position P3 and the non-working position P31 of the spreader 2B may be different from each other.

Figure 16A:
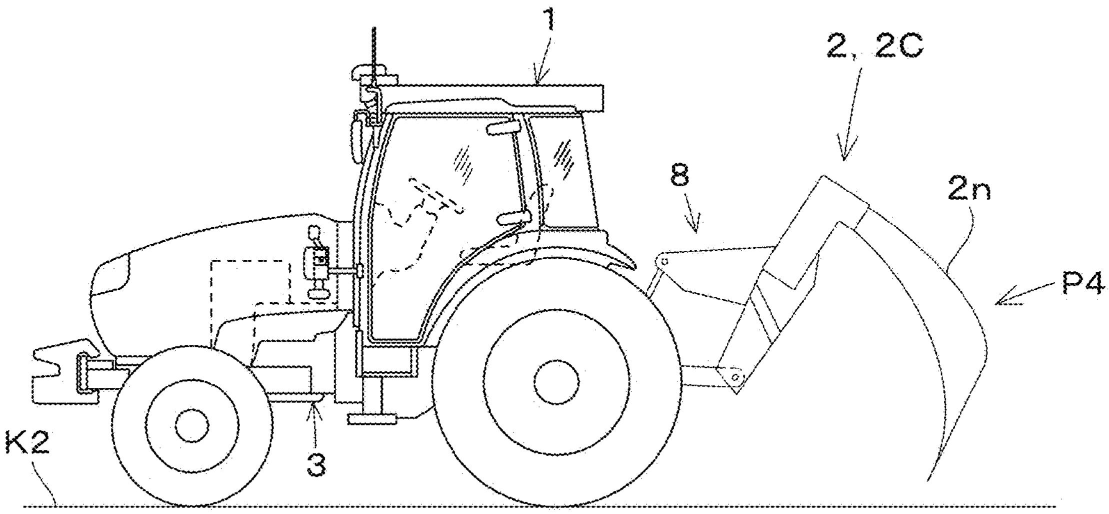
FIG. 16A illustrates an example of a non-working position of a stubble cultivator.
Figure 16B:
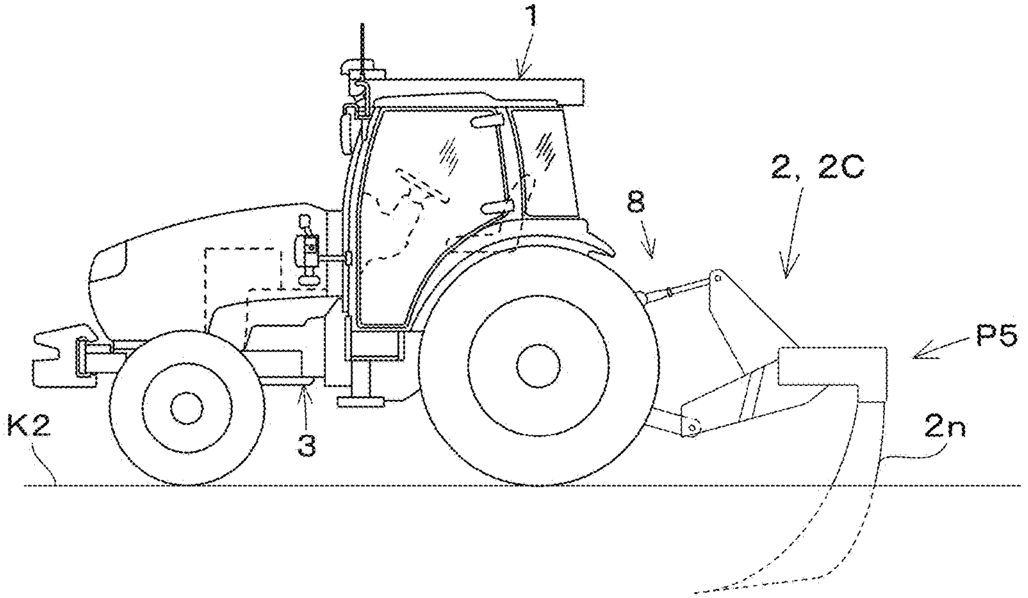
FIG. 16B illustrates an example of a working position of a stubble cultivator.

If the type of agricultural work is stubble-cultivating work and if the working device 2 coupled to the working vehicle 1 is a stubble cultivator 2C, as illustrated in FIG. 16A, the controller 60 causes the linkage 8 (raising/lowering device) to lower the stubble cultivator 2C to bring a working tine 2*n* of the stubble cultivator 2C into contact with the soil K2 of the agricultural field H so as to set the stubble cultivator 2C at the working position P5 at which the stubble cultivator 2C can do stubble-cultivating work, as illustrated in FIG. 16B. When carrying the stubble cultivator 2C, for example, as illustrated in FIG. 16A, the controller 60 causes the linkage 8 (raising/lowering device) to raise the stubble cultivator 2C to separate the working tine 2*n* from the soil K2, thus setting the stubble cultivator 2C at a non-working position P4 at which the stubble cultivator 2C is prevented from doing stubble-cultivating work.

When the working device 2 does certain type of agricultural work, such as seed sowing or water sprinkling, the controller 60 also sets the working device 2 (such as a seeder or a water sprinkler) for doing such work at a predetermined position (working position or non-working position) separated from the soil K2 of the agricultural field H by using the linkage 8 (raising/lowering device).

As stated above, working devices can be divided into a noncontact type that does work without contacting the soil K2 (ground) of the agricultural field H and a contact type that does work by contacting the soil K2 (ground) of the agricultural field H. The cultivator 2A and the stubble cultivator 2C are a contact type, whereas the seeder, the spreader 2B and a water sprinkler are a noncontact type.

After setting the working device 2 at the working position P1 in step S3 as discussed above, in step S4, the controller 60 causes the working vehicle 1 (vehicle body 3) to start traveling and the working device 2 to start doing agricultural work from the start position Ps (see FIG. 3, for example), based on the travel route L1 (working routes L1*a* and L1*s*) indicated by the automatic travel data and the position of the working vehicle 1 (vehicle body 3) detected by the position detector 40. That is, the controller 60 starts automatic operation of the working vehicle 1. In the example in FIG. 3, in step S5, the controller 60 causes the working device 2 to do agricultural work while causing the working vehicle 1 to travel along the working routes L1*a* provided in the central area C1 starting from the start position Ps and then to travel along the working routes L1*s* provided in the most inward headland E2*a* surrounding the central area C1.

In step S6, during the automatic operation or remote operation of the working vehicle 1, the controller 60 determines whether the position of the working vehicle 1 detected by the position detector 40 is at the position-short-of-border FP in front of the borderline BD stored in the storing device 65. If the position of the working vehicle 1 is not at the position-short-of-border FP (No in step S6), the controller 60 checks in step S7 whether the working vehicle 1 and the working device 2 have reached the goal position Pg (see FIG. 3, for example). If the working vehicle 1 and the working device 2 have not reached the goal position Pg (No in step S7), the controller 60 returns to step S5.

If the working vehicle 1 and the working device 2 have reached the goal position Pg (Yes in step S7), the controller 60 causes the working vehicle 1 to stop traveling and the working device 2 to stop doing agricultural work in step S8.

In this case, since no section is left in the agricultural field H where agricultural work is to be done under automatic operation, the controller 60 sets the working device 2 at the non-working position P2, P31, or P4 by using the linkage 8 (raising/lowering device), and automatic operation of the working vehicle 1 has been completed.

If it is determined in step S6 that the position of the working vehicle 1 is at the position-short-of-border FP in front of the borderline BD (Yes in step S6), the determiner 61*b* of the controller 60 determines in step S9 in FIG. 8B whether any of border-crossing permission conditions is satisfied.

FIG. 9 illustrates examples of the border-crossing permission conditions. The storing device 65 stores data indicating the border-crossing permission conditions shown in FIG. 9. As illustrated in FIG. 9, first through seventh permission conditions are provided as the border-crossing permission conditions. The determiner 61*b* determines in step S9 whether any one of the first through seventh permission conditions is satisfied.

The first permission condition is a condition that the working vehicle 1 is operated under remote control and the speed of the working vehicle 1 is lower than a prescribed value.

Figure 7B:
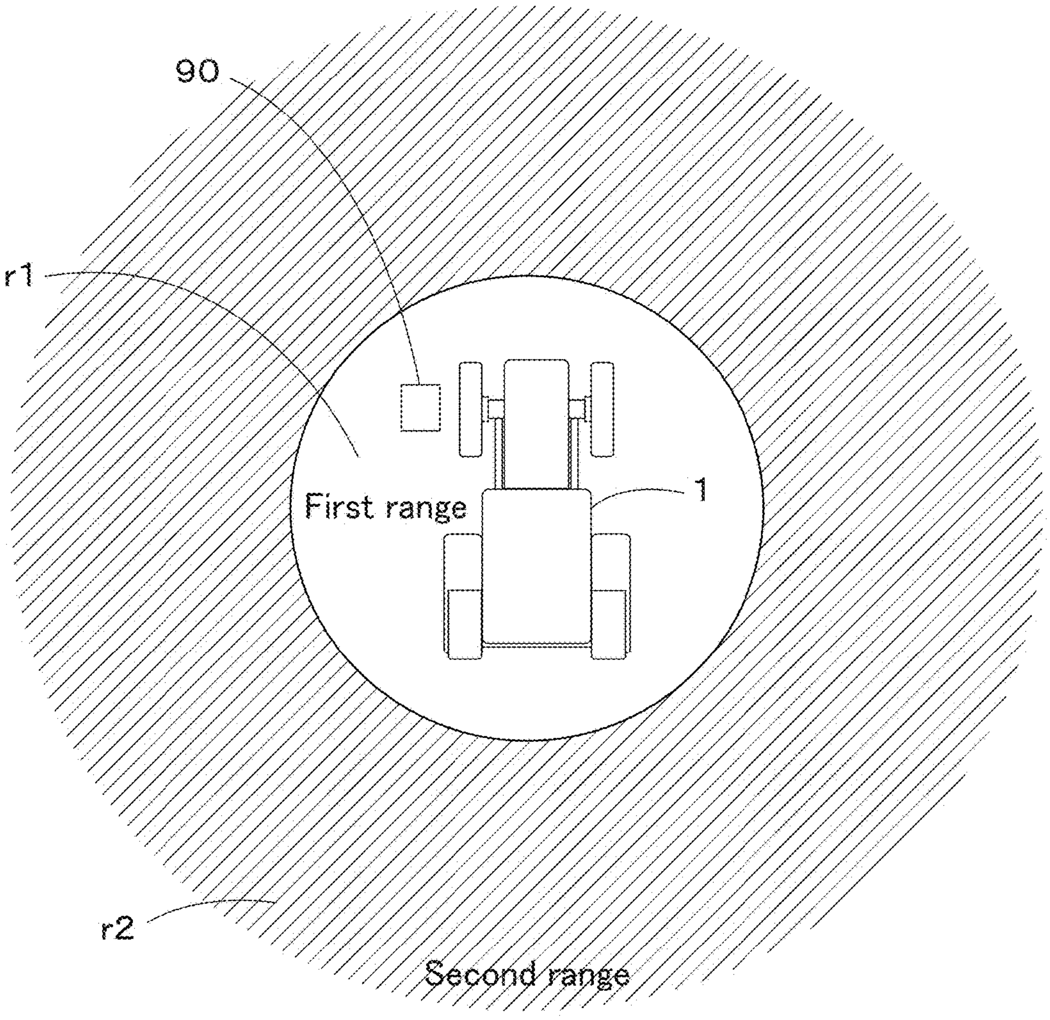
FIG. 7B illustrates that a remote controller is located within a predetermined range of a working vehicle.

The second permission condition is a condition that the working vehicle 1 is operated under remote control and the received signal strength is higher than or equal to a predetermined value. FIG. 7B illustrates that a remote controller is located within a predetermined range of a working vehicle. If the remote controller 90 is located in a range (second range r2 in FIG. 7B) outside a predetermined range (first range r1 in FIG. 7B), it means that the received signal strength of a signal (control signal) from the remote controller 90 is lower than the predetermined value.

The third permission condition is a condition that the working vehicle 1 is operated under remote control and the remote controller 90 is located within a predetermined range (first range r1 in FIG. 7B) of the working vehicle 1.

The fourth permission condition is a condition that the working vehicle 1 is operated under remote control and the working device 2 is not doing work. The fifth permission condition is a condition that the working vehicle 1 is operated under remote control and the working device 2 is a specific type. The sixth permission condition is a condition that the working vehicle 1 is operated under remote control and the height of the working device 2 is higher than or equal to a predetermined height. The seventh permission condition is a condition that the working vehicle 1 is operated under remote control and a user has set a permission setting.

That is, by determining whether a border-crossing permission condition is satisfied, the determiner 61*b* determines whether or not to allow the working vehicle 1, which is switched from automatic operation to remote operation performed by the remote controller 90, to cross the borderline BD to be in the cross-border state.

If the determiner 61*b* determines that one of the first through seventh permission conditions is satisfied (Yes in step S9), the border-crossing permitter 61*c* of the controller 60 allows the working vehicle 1 to be in the cross-border state in step S10. The border-crossing permitter 61*c* allows the working vehicle 1 to cross the borderline BD to be in the cross-border state, as illustrated in FIG. 7A. For example, the border-crossing permitter 61*c* allows the working vehicle 1 to be positioned in a beyond-border range where the working vehicle 1 crosses the borderline BD but does not pass through a maximum permissible line ML, as shown in FIG. 7A. If the working vehicle 1 reaches the maximum permissible line ML, the controller 60 stops the working vehicle 1.

The maximum permissible line ML is set to a first maximum permissible line ML1 slightly inward of the contour H1 of the agricultural field H. However, if the working vehicle 1 is unlikely to collide with or run on to a path, the maximum permissible line ML may be set to a second maximum permissible line ML2. If the working device 2 is a noncontact type that does work without contacting the ground or a separate type that does not contact the ground, such as the spreader 2B or a water sprinkler, it may be allowed to advance to a position just before reaching the second maximum permissible line ML2 beyond the first maximum permissible line ML1.

FIG. 7A shows an example in which the working vehicle 1 is allowed to move forward to cross the borderline BD. When the working vehicle 1 moves backward and the working device 2 crosses the borderline BD before the working vehicle 1, the border-crossing permitter 61*c* allows the working device 2 to cross the borderline BD to be in the cross-border state in a similar manner. When the working vehicle 1 moves backward, the border-crossing permitter 61*c* allows the rear portion of the working vehicle 1, that is, the working device 2, to be positioned in the beyond-border range where the working device 2 crosses the borderline BD but does not pass through the maximum permissible line ML. If the working vehicle 1 is traveling along the contour H1 of the agricultural field H and the left side or the right side of the working vehicle 1 crosses the borderline BD, the border-crossing permitter 61*c* allows the working vehicle 1 to be positioned in a beyond-border range where the left side or the right side of the working vehicle 1 (and the working device 2) crosses the borderline BD but does not pass through the maximum permissible line ML.

The limiter 61*d* limits the operation of the working vehicle 1 in the cross-border state in step S11. FIG. 10 shows examples of limitations on operations of a working vehicle and a working device. The storing device 65 stores limitation data indicating the limitations on the operations of the working vehicle 1 and the working device 2 shown in FIG. 10 and association data indicating the association of each limitation with a flag indicating whether the corresponding limitation is applied. If a flag for a certain limitation is ON, this limitation is applied. If a flag for a certain limitation is OFF, this limitation is not applied.

As illustrated in FIG. 10, the association data indicates the association between five pieces of limitation data and the flags for these pieces of data. The five pieces of limitation data indicate the limitations on the speed, acceleration, and changing of the speed stages of the working vehicle 1 in the cross-border state, the beyond-border range for the working vehicle 1, and the operation of the working device 2. In the example in FIG. 10, all the flags are ON, and thus, the speed, acceleration, and changing of the speed stages of the working vehicle 1 in the cross-border state, the beyond-border range for the working vehicle 1, and the operation of the working device 2 are all limited. If the flag for the limitation on the speed of the working vehicle 1 is only ON and the other flags are OFF, the speed of the working vehicle 1 is only limited.

FIG. 11 shows examples of details of limitations. The storing device 65 stores data indicating the details of limitations shown in FIG. 11. Specific examples of the details of limitations shown in FIG. 11 are as follows. The limitation on the speed of the working vehicle 1 is to limit the speed to a second prescribed speed v2, for example, which is lower than a first prescribed speed v1. The limitation on the acceleration of the working vehicle 1 is to limit the acceleration to a second prescribed acceleration a2, for example, which is lower than a first prescribed acceleration a1. The limitation on the changing of the speed stages is to maintain the first speed stage. That is, changing from the first speed stage to the second speed stage is not allowed. The limitation on the beyond-border range for the working vehicle 1 is to limit the movement of the working vehicle 1 to within a predetermined beyond-border range starting from the borderline BD. The limitation on the operation of the working device 2 is to prohibit the working device 2 from doing work or to limit the working range of the working device 2. Examples of the limitation on the working range of the working device 2 are to set the height of the working device 2 from the ground (soil K2) to a certain height or higher by the linkage 8 and to reduce the amount of operation of the working device 2. In one example, the height of the working device 2 raised and lowered by the linkage 8 is set to be high enough not to contact a path. In another example, if the working device 2 is the spreader 2B, the spreading amount is set to be smaller than a regular amount. This allows the spreader 2B to spread only a small amount of fertilizer or pesticide, for example, near the path.

If the determiner 61*b* determines that none of the first through seventh permission conditions are satisfied (No in step S9), the controller 60 does not permit the working vehicle 1 to be in the cross-border state in step S12. The border-crossing prevention controller 61*a* causes the working vehicle 1 to stop traveling in step S13 so as to prevent the working vehicle 1 from traveling beyond the borderline BD of the agricultural field H.

After step S11, the controller 60 determines in step S14 whether or not to restart automatic operation. For example, if the working vehicle 1 returns to the area which does not violate the borderline BD and if an instruction to start automatic operation is provided from the remote controller 90 (Yes in step S14), the controller 60 restarts automatic operation. In one example, if a remote operation stop signal is sent to the working vehicle 1 by a predetermined operation performed on the remote controller 90, the controller 60 restarts automatic operation if the working vehicle 1 is not in the manual operation mode and if the working vehicle 1 is not in the cross-border state. For example, if automatic operation has stopped in a mid-position of the travel route L1, this mid-position is stored in the storing device 65, and when automatic operation is restarted, the controller 60 restarts automatic operation at this mid-position.

After step S13 or if no instruction to restart automatic operation is provided (No in step S14), the controller 60 determines whether or not to perform manual driving in step S15. If an instruction to perform manual driving is provided (Yes in step S15), the controller 60 completes this processing. If no instruction to perform manual driving is provided (No in step S15), the controller 60 returns to step S14.

The working vehicle 1 may include an acquirer (object detector 64*a*) that acquires path information on a path in the agricultural field H, and the determiner 61*b* may determine whether or not to allow the working vehicle 1 to be in the cross-border state, based on the path information acquired by the object detector 64*a*. For example, the acquirer (object detector 64*a*) is a camera, a LiDAR, or an ultrasonic sensor, and acquires path information based on detection data, such as an image captured by a camera, or detection data obtained by a LiDAR or an ultrasonic sensor. The acquirer (object detector 64*a*) may identify the position of the path also by using the position of the working vehicle 1 detected by the position detector 40 and the agricultural field map MP2. With this configuration, even if it is determined based on the borderline BD in the agricultural field map MP2 that the working vehicle 1 is violating the borderline BD, the controller 60 can allow the working vehicle 1 to cross the borderline BD when there is physically no path.

Figure 7C:
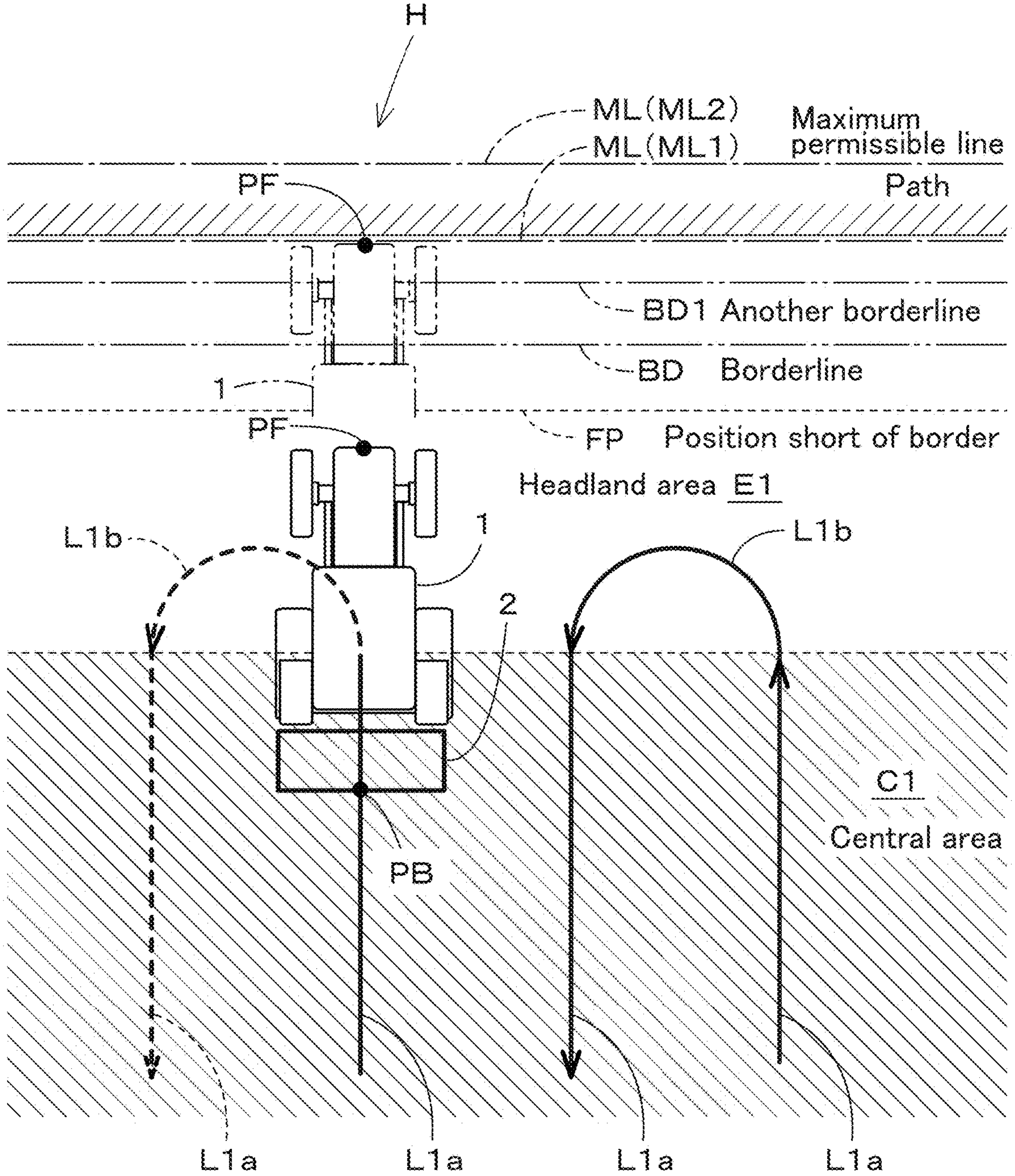
FIG. 7C illustrates that a working vehicle is crossing a borderline of an agricultural field.

As illustrated in FIG. 7C, when permitting the cross-border state, the border-crossing permitter 61*c* may set another borderline BD1 by shifting the borderline BD, and determine whether or not to permit a cross-border state in which the working vehicle 1 crosses the other borderline BD1. That is, when allowing the working vehicle 1 to cross borderline(s), a borderline (another borderline BD1) is additionally created at a position outward of the borderline BD, and the other borderline BD1 (line) can be used to perform a second-step determination to determine whether or not to permit the working vehicle 1 to cross a borderline. The content of limitation performed by the limiter 61*d* when the working vehicle 1 has crossed the borderline BD (first limitation) and the content of limitation when the working vehicle 1 has crossed the borderline BD1 (second limitation) may be different from each other. For example, the second limitation may be stricter than the first limitation.

The working vehicle 1 may include a storing device 65 to store in advance an agricultural field map MP2 including position information of the agricultural field H, position information of a travel route L1 for automatic operation in the agricultural field H, and position information of a borderline BD. The determiner 61*b* may be configured or programmed to, when automatic operation is switched to remote operation, determine, based on the borderline BD in the agricultural field map MP2 that was used for automatic operation, whether or not to permit the cross-border state in which the working vehicle 1 crosses the borderline BD. This operation is particularly useful for the configuration in which the agricultural field map MP2 does not become available when the automatic operation mode is switched to the remote operation mode (when the operation mode is switched). With this operation, the agricultural field map MP2 does become available when the operation mode is switched, thus making it possible to securely and reliably determine whether or not to permit the cross-border state.

The working vehicle 1 may include a storing device 65 to store in advance an agricultural field map MP2 including position information of the agricultural field H, position information of a travel route L1 for automatic operation in the agricultural field H, and position information of a borderline BD. The determiner 61*b* may be configured or programmed to, when the agricultural field map MP2 is not selected, determine to permit the cross-border state. One example would be a configuration in which a radio control mode is entered only when the automatic operation mode is switched to the remote operation. In this configuration, a default setting may be set in which the agricultural field map MP2 is always selected when the radio control mode is performed. However, there may be a case in which a remote control is performed when the agricultural field map MP2 is not selected. For example, if the above-described default setting is OFF, the agricultural field map MP2 is not selected and a remote control may be performed in this state. This state can be regarded as the same state as the state in which the cross-border state is permitted. Accordingly, when the agricultural field map MP2 is not selected, the cross-border state can be permitted.

The working vehicle 1 may include an obstacle sensor (object detector 64*a*) and a controller 60 that stops the working vehicle 1 if the object detector 64*a* detects an obstacle even if the determiner 61*b* determines to permit the cross-border state. This can secure the safety of the working vehicle 1 in the cross-border state. For example, when it is determined that the working vehicle 1 is allowed to be in the cross-border state, a safety sensor (at least the obstacle sensor (object detector 64*a*)) may be automatically turned ON. Such a safety sensor may be constantly ON.

First Variation

The working vehicle 1 of a first variation will be described below. The limiter 61*d* in the first variation changes limitation(s) on the content of the operation of the working vehicle 1 in the cross-border state based on the geographical features of the agricultural field H and the travel direction of the working vehicle 1. More specifically, the limiter 61*d* less strictly or more strictly limits the content of operation of the working vehicle 1 in the cross-border state, based on the tilt angle and the tilt direction of the agricultural field H, which are the geographical features of the agricultural field H, and the travel direction of the working vehicle 1.

Figure 12:
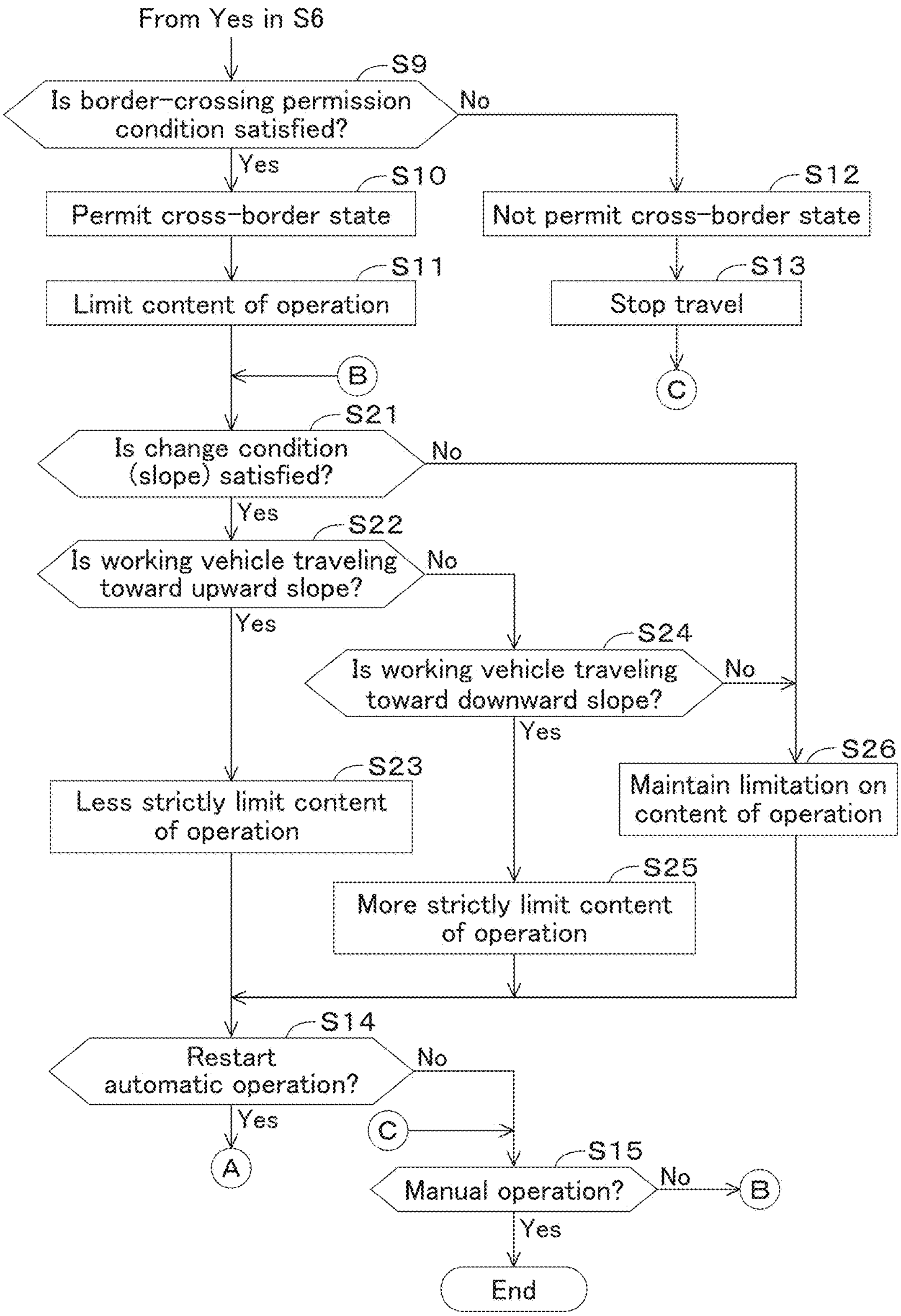
FIG. 12 is a flowchart illustrating an example of the operation of a working vehicle according to a first variation.

FIG. 12 is a flowchart illustrating an example of the operation of a working vehicle of the first variation. Steps S1 through S15 in FIG. 12 are the same as those in FIGS. 8A and 8B, and steps S21 through S26, which are not included in FIG. 8B, will be explained below.

As shown FIG. 12, the controller 60 determines whether a change condition (i.e., slope) is satisfied (S21 in FIG. 12). The controller 60 determines whether the working vehicle 1 is positioned on a slope, based on the roll angle and the pitch angle of the working vehicle 1 (vehicle body 3) detected by the IMU 40*b*.

If the roll angle and the pitch angle of the working vehicle 1 are larger than or equal to predetermined angles, the controller 60 determines that the working vehicle 1 is positioned on a slope (Yes in step S21). The controller 60 then determines in step S22 whether the area in the travel direction of the working vehicle 1 is a upward slope. If the pitch angle of the working vehicle 1 shows that the area in the travel direction is an upward slope having a predetermined angle or larger (Yes in step S22), in step S23, the limiter 61*d* relaxes a limitation on the operation of the working vehicle 1 which is to cross a borderline BD or is in the cross-border state.

FIG. 13A shows examples of the relaxation of limitations. The storing device 65 stores data indicating the relaxation of limitations shown in FIG. 13A. Specific examples of the relaxation of limitations shown in FIG. 13A are as follows. The relaxation of the limitation on the speed of the working vehicle 1 is to increase the speed to a third prescribed speed v3, for example, which is higher than or equal to the second prescribed speed v2 and lower than the first prescribed speed v1. The relaxation of the limitation on the acceleration of the working vehicle 1 is to increase the acceleration to a third prescribed acceleration a3, for example, which is higher than or equal to the second prescribed acceleration a2 and lower than the first prescribed acceleration a1. The limitation on the changing of the speed stages of the working vehicle 1 is to raise the highest set value for the first speed stage (first speed range).

For example, if the beyond-border range is an upward slope and if the area in the travel direction of the working vehicle 1 in the cross-border state is an upward slope, the limiter 61*d* relaxes a limitation on the operation of the working vehicle 1. For example, the limiter 61*d* increases the speed limit of the working vehicle 1 (0.5 km/h, for example) to a speed (0.7 km/h, for example) in accordance with the tilt angle.

If the pitch angle of the working vehicle 1 does not show that the area in the travel direction is an upward slope having the predetermined angle or larger (No in step S22), the limiter 61*d* determines in step S24 whether the area in the travel direction of the working vehicle 1 is a downward slope. If the pitch angle of the working vehicle 1 shows that the area in the travel direction is a downward slope having a predetermined angle or larger (Yes in step S24), in step S25, the limiter 61*d* tightens a limitation on the operation of the working vehicle 1 which is to cross the borderline BD or is in the cross-border state.

FIG. 13B shows examples of the tightening of limitations. The storing device 65 stores data indicating the tightening of limitations shown in FIG. 13B. Specific examples of the tightening of limitations shown in FIG. 13B are as follows. The tightening of the limitation on the speed of the working vehicle 1 is to decrease the speed to a fourth prescribed speed v4, for example, which is lower than the second prescribed speed v2. The tightening of the limitation on the acceleration of the working vehicle 1 is to decrease the acceleration to a fourth prescribed acceleration a4, for example, which is lower than the second prescribed acceleration a2. The tightening on the changing of the speed stages of the working vehicle 1 is to lower the highest set value for the first speed stage (first speed range).

For example, if the beyond-border range is a downward slope and if the area in the travel direction of the working vehicle 1 in the cross-border state is a downward slope, the limiter 61*d* tightens a limitation on the operation of the working vehicle 1. For example, the limiter 61*d* decreases the speed limit of the working vehicle 1 (0.5 km/h, for example) to a speed (0.3 km/h, for example) in accordance with the tilt angle.

If the result of step S21 is No or if the result of step S24 is No, the limiter 61*d* maintains the limitations on the operation of the working vehicle 1 in step S26. After step S23, S25, or S26, the controller 60 proceeds to step S14. Steps S14 and S15 in FIG. 12 are the same as those in FIG. 8B, and an explanation thereof will thus be omitted.

The major features and advantages of the working vehicle 1 according to the above-described first example embodiment are as follows.

(Item A1) A working vehicle 1 to perform automatic operation including doing work at an agricultural field H using a working device 2, including a border-crossing prevention controller 61*a* configured or programmed to prohibit the working vehicle 1 from traveling beyond a borderline BD of the agricultural field H, a determiner 61*b* configured or programmed to determine whether or not to permit a cross-border state in which the working vehicle 1 remotely operated by a remote controller 90 crosses the borderline BD, a border-crossing permitter 61*c* configured or programmed to permit the cross-border state if the determiner 61*b* determines to permit the cross-border state, and a limiter 61*d* configured or programmed to limit content of an operation of the working vehicle 1 in the cross-border state.

With this configuration, when the cross-border state is not permitted, the working vehicle 1 is prohibited from traveling beyond the borderline BD of the agricultural field H, making it possible to eliminate or reduce the likelihood that the working vehicle 1 will cross the border. That is, it is possible to ensure a configuration that the working vehicle 1 does not cross the border. On the other hand, when the cross-border state is permitted during the remote operation controlled by the remote controller 90, the content of operation of the working vehicle 1 in the cross-border state is limited, thus ensuring the safety of the working vehicle 1 in the cross-border state. It is thus possible to eliminate or reduce the likelihood that the working vehicle 1 will cross the border during the automatic operation and possible to allow the working vehicle 1 to cross the border while ensuring the safety of the working vehicle 1 in the cross-border state during the remote operation.

(Item A2) The working vehicle 1 according to item A1, wherein the determiner 61*b* is configured or programmed to determine to permit the cross-border state if a vehicle speed of the working vehicle 1 is lower than a prescribed value, and determine not to permit the cross-border state if the vehicle speed of the working vehicle 1 is higher than or equal to the prescribed value.

With this configuration, the working vehicle 1 can safely cross the border if the vehicle speed of the working vehicle 1 is lower than the prescribed value. It is thus possible to ensure the safety of the working vehicle 1 when crossing the border.

(Item A3) The working vehicle 1 according to item A1 or A2, wherein the determiner 61*b* is configured or programmed to determine to permit the cross-border state if a received signal strength of a control signal from the remote controller 90 is higher than or equal to a predetermined value, and determine not to permit the cross-border state if the received signal strength is lower than the predetermined value.

With this configuration, the following is achieved. If the received signal strength of a control signal from the remote controller 90 is higher than or equal to the predetermined value, since a remote operator (user) operating the remote controller 90 is positioned near the working vehicle 1 (within a predetermined distance from the working vehicle 1), the remote operator is able to operate the working vehicle 1 in the cross-border state while confirming safety even if the cross-border state is permitted. On the other hand, if the received signal strength is lower than the predetermined value, since the remote operator (user) is at a distance from the working vehicle 1 (outside the predetermined distance from the working vehicle 1), the remote operator is unable to confirm safety sufficiently and therefore the cross-border state is not permitted. This makes it possible to ensure that the remote operator performs operations near the working vehicle 1, making it possible to ensure safety when the working vehicle 1 crosses the border.

(Item A4) The working vehicle 1 according to any one of items A1 to A3, wherein the determiner 61*b* is configured or programmed to determine to permit the cross-border state if a position indicated by position information of the remote controller 90 is within a predetermined range from the working vehicle 1, and determine not to permit the cross-border state if the position is outside the predetermined range from the working vehicle 1.

With this configuration, if the remote controller 90 is positioned within the predetermined range (first range r1 in FIG. 7B) from the working vehicle 1, since a remote operator operating the remote controller 90 is positioned near the working vehicle 1 (within the predetermined range from the working vehicle 1), the remote operator is able to operate the working vehicle 1 in the cross-border state while confirming safety even if the cross-border state is permitted. On the other hand, if the remote controller 90 is positioned in a range (second range r2 in FIG. 7B) outside the predetermined range from the working vehicle 1, since the remote operator is far away from the working vehicle 1 (outside the predetermined range from the working vehicle 1), the user is unable to confirm safety sufficiently, and therefore the cross-border state is not permitted. This makes it possible to ensure that the remote operator performs operations near the working vehicle 1, making it possible to ensure safety when the working vehicle 1 crosses the border.

(Item A5) The working vehicle 1 according to any one of items A1 to A4, wherein the determiner 61*b* is configured or programmed to determine to permit the cross-border state if the working device 2 is not doing work, and determine not to permit the cross-border state if the working device 2 is doing work.

With this configuration, when the working device 2 is not doing work at the agricultural field H, the working vehicle 1 can cross the borderline BD safely, and it is possible to eliminate or reduce the likelihood that work will be performed at an area (path, for example) other than the target area of the agricultural field H. It is thus possible to ensure the safety when the working vehicle 1 crosses the border.

(Item A6) The working vehicle 1 according to any one of items A1 to A5, wherein the determiner 61*b* is configured or programmed to determine whether or not to permit the cross-border state based on a type of the working device 2.

With this configuration, the working vehicle 1 can cross the border in an appropriate manner depending on the type of working device 2.

(Item A7) The working vehicle 1 according to item A6, wherein the determiner 61*b* is configured or programmed to determine to permit the cross-border state if the type of the working device 2 is a noncontact type that does work without contacting a ground, and determine to not permit the cross-border state if the type of the working device 2 is a contact type that does work by contacting the ground.

With this configuration, if the type of working device 2 is a noncontact type that does work without contacting the ground, the working device 2 can be prevented from contacting an area (path, for example) other than the target area of the agricultural field H, and the working vehicle 1 can safely cross the border. It is thus possible to ensure safety when the working vehicle 1 crosses the border.

(Item A8) The working vehicle 1 according to any one of items A1 to A7, wherein the determiner 61*b* is configured or programmed to determine whether or not to permit the cross-border state based on a height of the working device 2.

With this configuration, the working vehicle 1 can cross the border in an appropriate manner depending on the height of the working device 2.

(Item A9) The working vehicle 1 according to any one of items A1 to A8, further including a setter 61*e* configured or programmed to make a setting to permit or not to permit the cross-border state in accordance with a user selection, wherein the determiner 61*b* is configured or programmed to, if permitting the cross-border state is set by the setter 61*e*, determine to permit the cross-border state, and if not permitting the cross-border state is set by the setter 61*e*, determine to not permit the cross-border state.

With this configuration, permitting or not permitting the cross-border state is set via a user selection, making it possible to appropriately change whether or not to permit border crossing or not.

(Item A10) The working vehicle 1 according to item A1, wherein the determiner 61*b* is configured or programmed to determine whether or not to permit the cross-border state in which the working vehicle 1, which has been switched from the automatic operation to a remote operation controlled by the remote controller 90, crosses the borderline BD.

With this configuration, with regard to the working vehicle 1 having been switched from the automatic operation to the remote operation controlled by the remote controller 90, it is possible to prevent the working vehicle 1 from crossing the border during automatic operation, and allow the working vehicle 1 to cross the border while confirming the safety of the working vehicle 1 in the cross-border state during the remote operation.

(Item A11) The working vehicle 1 according to any one of items A1 to A10, wherein the determiner 61*b* is configured or programmed to determine whether or not to permit the cross-border state upon detection of switching to a remote control.

With this configuration, it is not necessary to perform any special determination other than detecting switching to the remote control. This makes it possible to reduce the processing load for determination and to perform determination more smoothly.

(Item A12) The working vehicle 1 according to any one of items A1 to A10, further including a position detector 40 to detect a position of the working vehicle 1, and a memory and/or a storage 65 to store in advance an agricultural field map MP2 including position information of the agricultural field H and position information of the borderline BD, wherein the determiner 61*b* is configured or programmed to determine whether or not to permit the cross-border state when the position of the working vehicle 1 detected by the position detector 40 is at a position FP short of the borderline BD stored in the memory and/or the storage 65.

With this configuration, it is possible, when the working vehicle 1 is approaching the borderline BD, to determine whether or not to permit the cross-border state. Thus, it is possible to determine whether or not to permit the cross-border state at an appropriate timing (i.e., immediately before the working vehicle 1 crosses the borderline BD).

(Item A13) The working vehicle 1 according to any one of items A1 to A10, wherein the limiter 61*d* is configured or programmed to limit at least one of a vehicle speed of the working vehicle 1 in the cross-border state, an acceleration of the working vehicle 1 in the cross-border state, changing a speed stage of the working vehicle 1 in the cross-border state, a beyond-border range for the working vehicle 1, or content of an operation of the working device 2.

With this configuration, at least one of the vehicle speed, acceleration, or seed stage of the working vehicle 1, the beyond-border range for the working vehicle 1, or the content of operation of the working device 2 is limited when the working vehicle 1 is in the cross-border state. The working vehicle 1 can thus be permitted to cross the border while ensuring the safety of the working vehicle 1 in the cross-border state.

(Item A14) The working vehicle 1 according to item A13, wherein the limiter 61*d* is configured or programmed to change one or more limitations on the content of the operation of the working vehicle 1 in the cross-border state based on a geographical feature of the agricultural field H and a travel direction of the working vehicle 1.

With this configuration, the limitation(s) on the content of the operation of the working vehicle 1 in the cross-border state is/are changed based on the geographical feature of the agricultural field H and the travel direction of the working vehicle 1. This makes it possible to appropriately limit the content of the operation of the working vehicle 1 in the cross-border state.

(Item A15) The working vehicle 1 according to item A14, wherein the limiter 61*d* is configured or programmed to less strictly or more strictly limit the content of the operation of the working vehicle 1 in the cross-border state based on an angle of slope and a direction of slope of the agricultural field H as the geographical feature of the agricultural field H, and based on the travel direction of the working vehicle 1.

With this configuration, the limiter 61*d* less strictly limits or more strictly limits the content of the operation of the working vehicle 1 in the cross-border state, based on the angle and the direction of slope the agricultural field H, which are the geographical feature of the agricultural field H, and based on the travel direction of the working vehicle 1. For example, if the beyond-border range is an upward slope and the working vehicle 1 in the cross-border state travels toward the upward slope, the limiter 61*d* less strictly limits the content of the operation of the working vehicle 1 (for example, the limiter 61*d* increases the speed limit of the working vehicle 1 (0.5 km/h, for example) to an increased speed (0.7 km/h, for example) in accordance with the angle of slope). On the other hand, if the beyond-border range is a downward slope and the working vehicle 1 in the cross-border state travels toward the downward slope, the limiter 61*d* more strictly limits the content of the operation of the working vehicle 1 (for example, the limiter 61*d* reduces the speed limit of the working vehicle 1 (0.5 km/h, for example) to a reduced speed (0.3 km/h, for example) in accordance with the angle of stope).

(Item A16) The working vehicle 1 according to any one of items A1 to A10, further including an acquirer (object detector) 64*a* to acquire path information indicating a path of the agricultural field H, wherein the determiner 61*b* is configured or programmed to determine whether or not to permit the cross-border state based on the path information acquired by the acquirer (object detector) 64*a*.

With this configuration, even if it is determined, based on the borderline BD (border) created on the agricultural field map MP2, that the border is to be crossed, the working vehicle 1 can be permitted to cross the border when there are no physical paths.

(Item A17) The working vehicle 1 according to any one of items A1 to A10, wherein the border-crossing permitter 61*c* is configured or programmed to, when permitting the cross-border state, set another borderline BD1 by shifting the borderline BD, and determine whether or not to permit a cross-border state in which the working vehicle 1 crosses the other borderline BD1.

With this configuration, when permitting border crossing, another borderline (another borderline BD1) is created at a position shifted outward from the current borderline BD, making it possible to perform a second-step determination of whether or not to permit border crossing using the other borderline BD1 (line).

(Item A18) The working vehicle 1 according to any one of items A1 to A10, further including a memory and/or a storage 65 to store in advance an agricultural field map MP2 including position information of the agricultural field H, position information of a travel route for the automatic operation in the agricultural field H, and position information of the borderline BD, wherein the determiner 61*b* is configured or programmed to, when the automatic operation is switched to remote operation, determine whether or not to permit the cross-border state in which the working vehicle 1 crosses the borderline BD, based on the borderline BD of the agricultural field map MP2 that was used in the automatic operation.

This configuration is particularly advantageous compared to a configuration in which the agricultural field map MP2 does not continue to be used when the automatic operation mode is switched to the remote operation mode (when the operation mode is switched). The agricultural field map MP2 reliably continues to be used when the operation mode is switched, making it possible to reliably and safely determine whether or not to permit border crossing.

(Item A19) The working vehicle 1 according to any one of items A1 to A10, further including a memory and/or a storage 65 to store in advance an agricultural field map MP2 including position information of the agricultural field H, position information of a travel route L1 for the automatic operation in the agricultural field H, and position information of the borderline BD, wherein the determiner 61*b* is configured or programmed to, when the agricultural field map MP2 is not selected, determine to permit the cross-border state.

With this configuration, in the case where the remote control is performed with no agricultural field maps MP2 selected, it is possible to determine that not selecting an agricultural field map MP2 indicates that the cross-border state is permitted. It is thus possible to appropriately permit the cross-border state.

(Item A20) The working vehicle 1 according to any one of items A1 to A10, further including an obstacle sensor (object detector) 64*a* to detect an obstacle, and a controller 60 configured or programmed to stop the working vehicle 1 if the obstacle sensor (object detector) 64*a* detects an obstacle even in a case that the determiner 61*b* determines to permit the cross-border state.

With this configuration, it is possible to ensure the safety of the working vehicle 1 in the cross-border state.

Second Example Embodiment

For example, a working vehicle may perform overturn prevention control during automatic operation or remote operation. In the related art, if a known working vehicle is stopped in an oblique orientation due to the execution of overturn prevention control during automatic operation and is then switched to remote operation, it is unable to perform remote operation because overturn prevention control is still effective. Therefore, the operability of remote operation is poor. To handle such a situation, a user needs to get in the working vehicle to move it manually.

The present inventors have gained the following knowledge. For example, when a user performs remote operation near a working vehicle which is stopped in an oblique orientation, he/she can visually check the safety of the working vehicle. It may thus be possible to allow the working vehicle to travel under remote operation by setting the absolute value of a predetermined tilt angle (threshold) used for remote operation to be greater than that of a predetermined tilt angle (threshold) used for automatic operation. Conversely, if the user is not familiar with remote control, it may be necessary to secure the safety of the working vehicle under remote operation by setting the absolute value of the predetermined tilt angle (threshold) used for remote operation to be smaller than that of the predetermined tilt angle (threshold) used for automatic operation.

Based on the above-described knowledge, the present inventors have attained the configuration of a working vehicle 1 of a second example embodiment.

Figure 18:
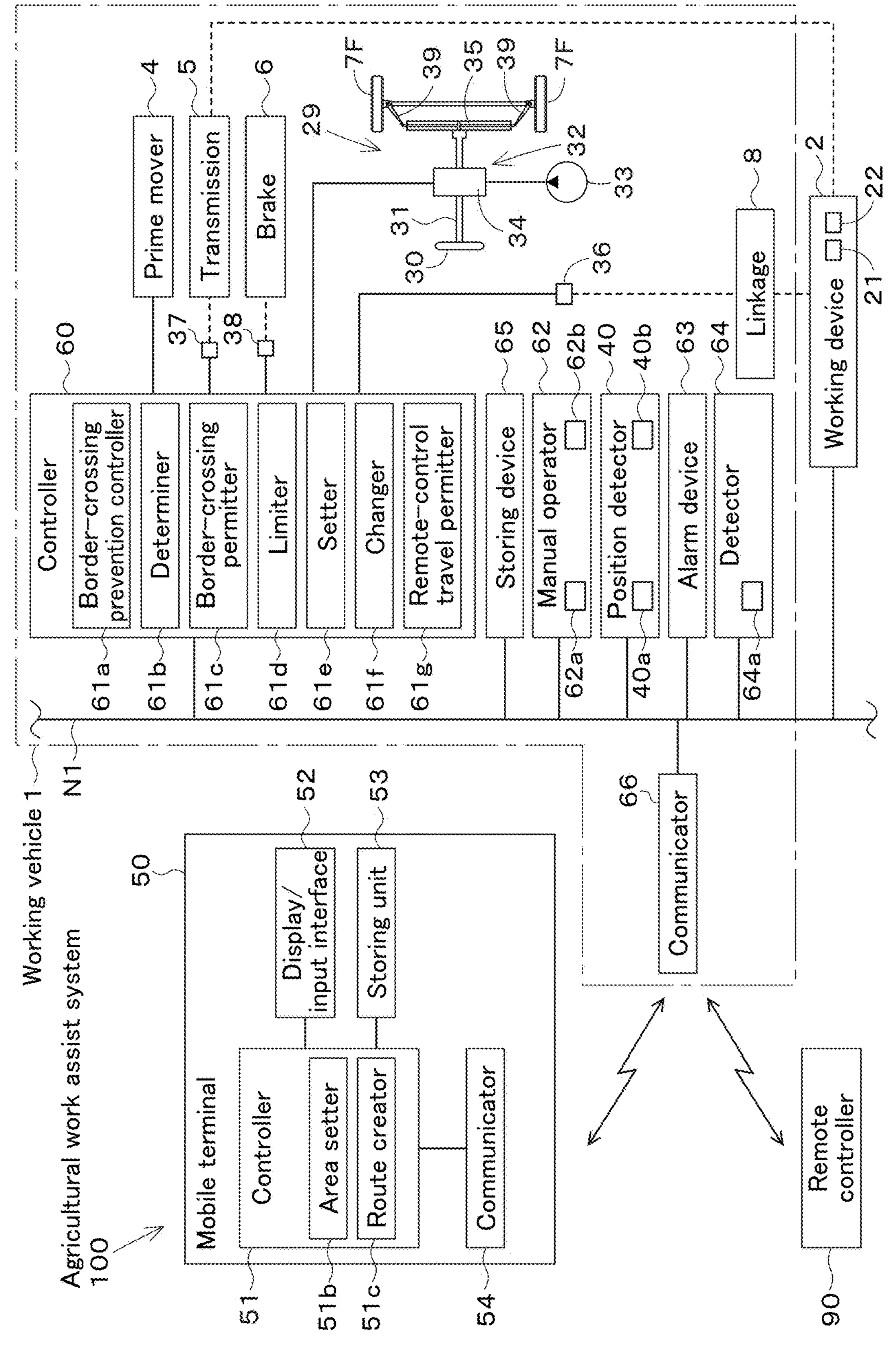
FIG. 18 is a schematic diagram of an agricultural work assist system according to a second example embodiment of the present invention.

FIG. 18 is a schematic diagram of an agricultural work assist system according to the second example embodiment. The setter 61*e* of the working vehicle 1 in the second example embodiment is different from that of the first example embodiment in that it can set a first threshold θ1 for automatic operation and a second threshold θ2 for remote operation.

The working vehicle 1 of the second example embodiment is different from that of the first example embodiment in that it also includes a changer 61*f* and a remote-control travel permitter 61*g*, as illustrated in FIG. 18, and that the limiter 61*d* limits the operation of the working vehicle 1 in a tilted state. The elements of the second example embodiment similar to those of the first example embodiment are designated by like reference numerals and an explanation thereof will be omitted.

The setter 61*e* sets the first threshold θ1 for automatic operation and the second threshold θ2 for remote operation performed by the remote controller 90. FIG. 19 shows examples of the thresholds that are set in accordance with the individual operation modes. As illustrated in FIG. 19, the first threshold θ1 is a threshold for the tilt angle θ to be used for automatic operation, while the second threshold θ2 is a threshold for the tilt angle θ to be used for remote operation with the remote controller 90. In FIG. 19, the absolute value of the second threshold θ2 is larger than that of the first threshold θ1. Conversely, the absolute value of the first threshold θ1 may be larger than that of the second threshold θ2. The storing device 65 stores the first threshold θ1 and the second threshold θ2 set by the setter 61*e*.

When the tilt angle θ of the working vehicle 1 reaches the first threshold θ1 during automatic operation or the second threshold θ2 during remote operation, the controller 60 causes the working vehicle 1 to stop traveling.

The controller 60 includes the changer 61*f*. The changer 61*f* changes the second threshold θ2 based on a predetermined condition. FIG. 21 illustrates predetermined conditions used in the second example embodiment. The storing device 65 stores data indicating the predetermined conditions (first through sixth predetermined conditions in FIG. 21). More specifically, when any of the first through sixth predetermined conditions is satisfied, the changer 61*f* changes the second threshold θ2.

In this example, the changer 61*f* changes the second threshold θ2 based on the predetermined conditions. Alternatively, the changer 61*f* may change the first threshold θ1 based on the predetermined conditions.

Specific examples of the predetermined conditions to change the second threshold θ2 are as follows. As a predetermined condition (first predetermined condition in FIG. 21), if the received signal strength of a control signal from the remote controller 90 is higher than or equal to a predetermined value, the changer 61*f* changes the second threshold θ2 such that its absolute value increases. For example, the changer 61*f* changes the second threshold θ2 to a second threshold θ21 shown in FIG. 19 such that the absolute value of the second threshold θ21 is greater than that of the second threshold θ2. If the received signal strength is lower than the predetermine value, the changer 61*f* does not change the second threshold θ2.

As a predetermined condition (second predetermined condition in FIG. 21), if the remote controller 90 is positioned within a predetermined range (first range r1 in FIG. 7B) of the working vehicle 1, the changer 61*f* changes the second threshold θ2 such that its absolute value increases. For example, the changer 61*f* changes the second threshold θ2 to the second threshold θ21 shown in FIG. 19. If the remote controller 90 is positioned in a range outside the predetermined range (second range r2 outside the first range r1, for example), the changer 61*f* does not change the second threshold θ2.

Figure 24A:
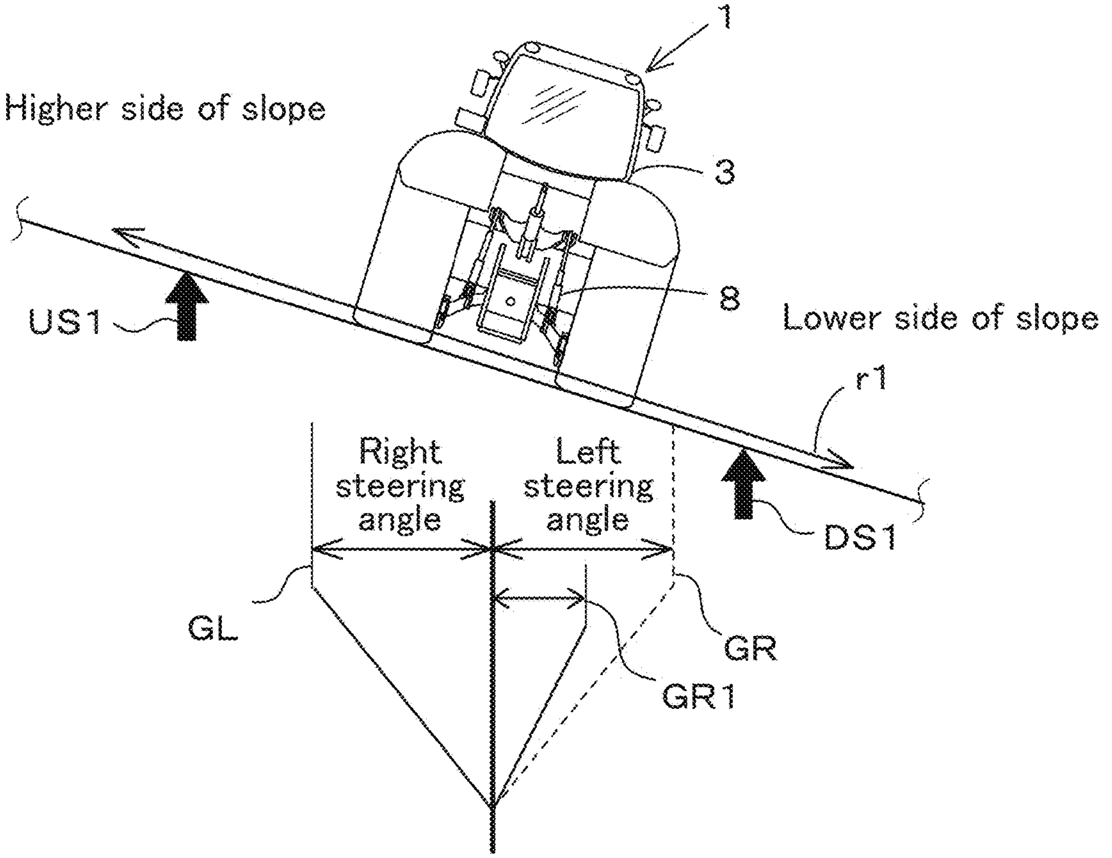
FIG. 24A is a rear view of a working vehicle leaning to the right.
Figure 24B:
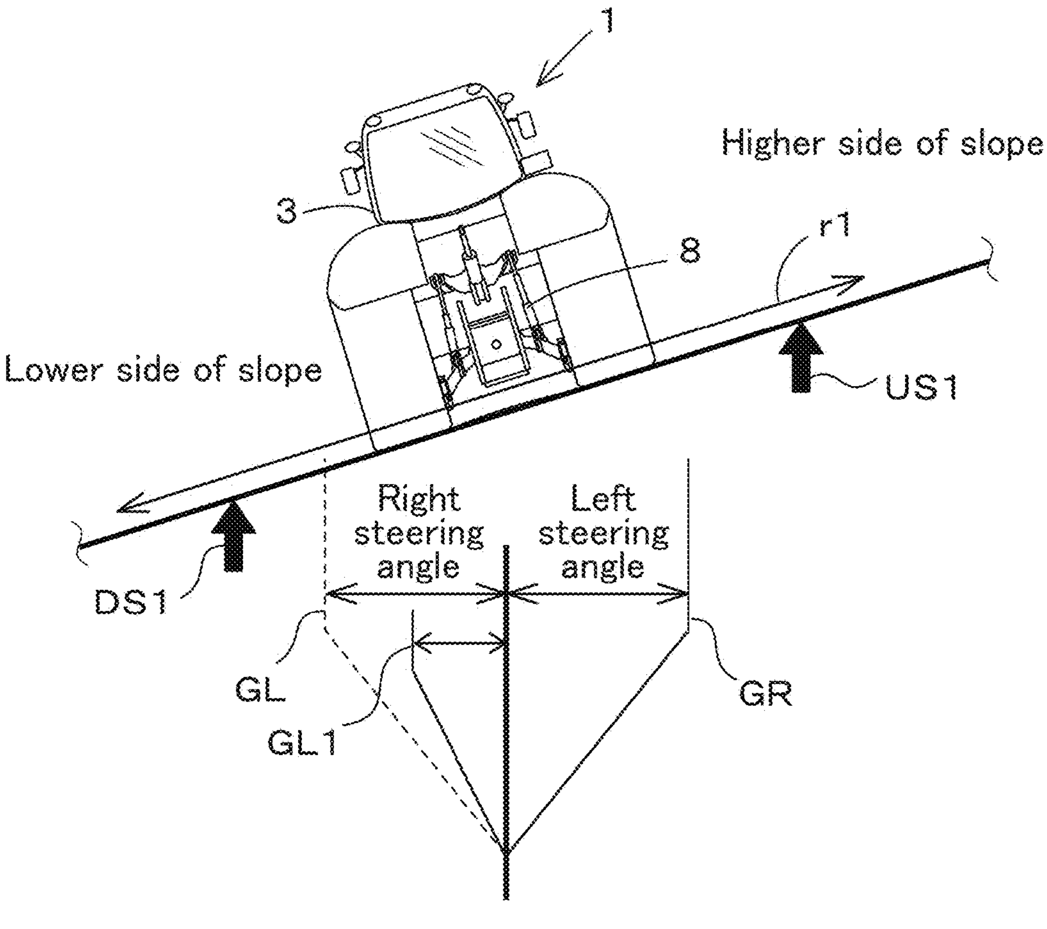
FIG. 24B is a rear view of a working vehicle leaning to the left.

FIG. 24A is a rear view of a working vehicle leaning to the right. FIG. 24B is a rear view of a working vehicle leaning to the left. As a predetermined condition (third predetermined condition in FIG. 21), as illustrated in FIGS. 24A and 24B, if the remote controller 90 is positioned within the predetermined range (first range r1) from the working vehicle 1 and if it is located higher than the working vehicle 1 on a slope (if the remote controller 90 is located at a position US1), the changer 61*f* changes the second threshold θ2 (to the second threshold θ21, for example) such that the absolute value increases. As illustrated in FIGS. 24A and 24B, if the remote controller 90 is positioned within the predetermined range (first range r1) from the working vehicle 1 and if it is located lower than the working vehicle 1 on a slope (if the remote controller 90 is located at a position DS1), the changer 61*f* does not change the second threshold θ2.

As a predetermined condition (fourth predetermined condition in FIG. 21), the changer 61*f* changes the second threshold θ2 based on the type of working device 2. For example, as a predetermined condition, if the working device 2 is a contact type that does work by contacting the ground, the changer 61*f* changes the second threshold θ2 (to the second threshold θ21, for example) such that the absolute value increases. If the working device 2 is a noncontact type that does work without contacting the ground, the changer 61*f* does not change the second threshold θ2. As a predetermined condition, if the working device 2 is a traveling type having wheels or crawlers, the changer 61*f* changes the second threshold θ2 (to the second threshold θ21, for example) such that its absolute value increases. If the working device 2 is a separation type that has a center of gravity higher than a predetermined position and does not contact the ground, the changer 61*f* does not change the second threshold θ2.

Figure 25A:
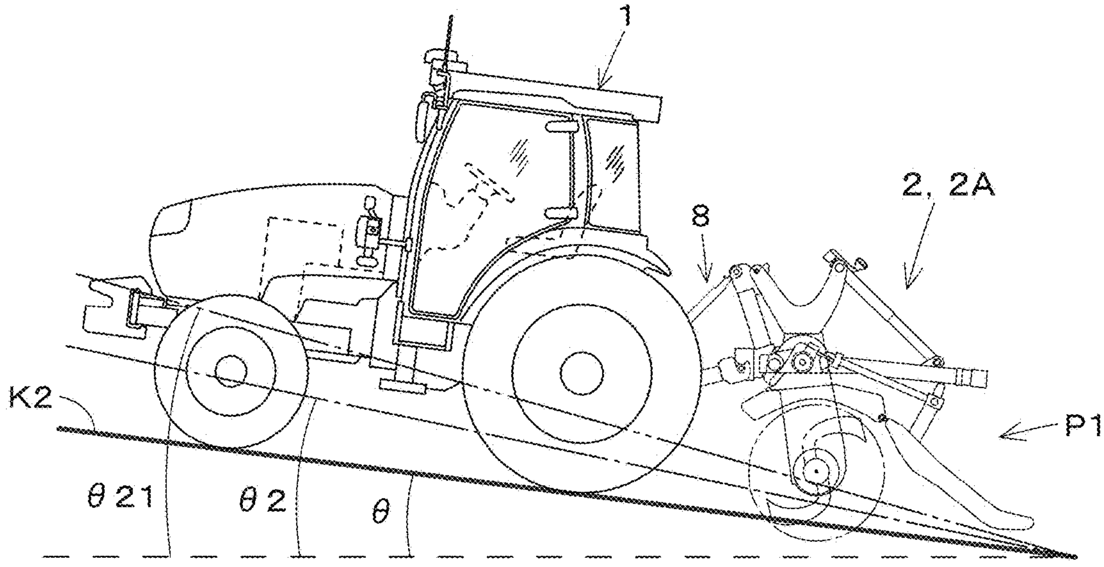
FIG. 25A is a side view of a working vehicle on an upward slope.
Figure 25B:
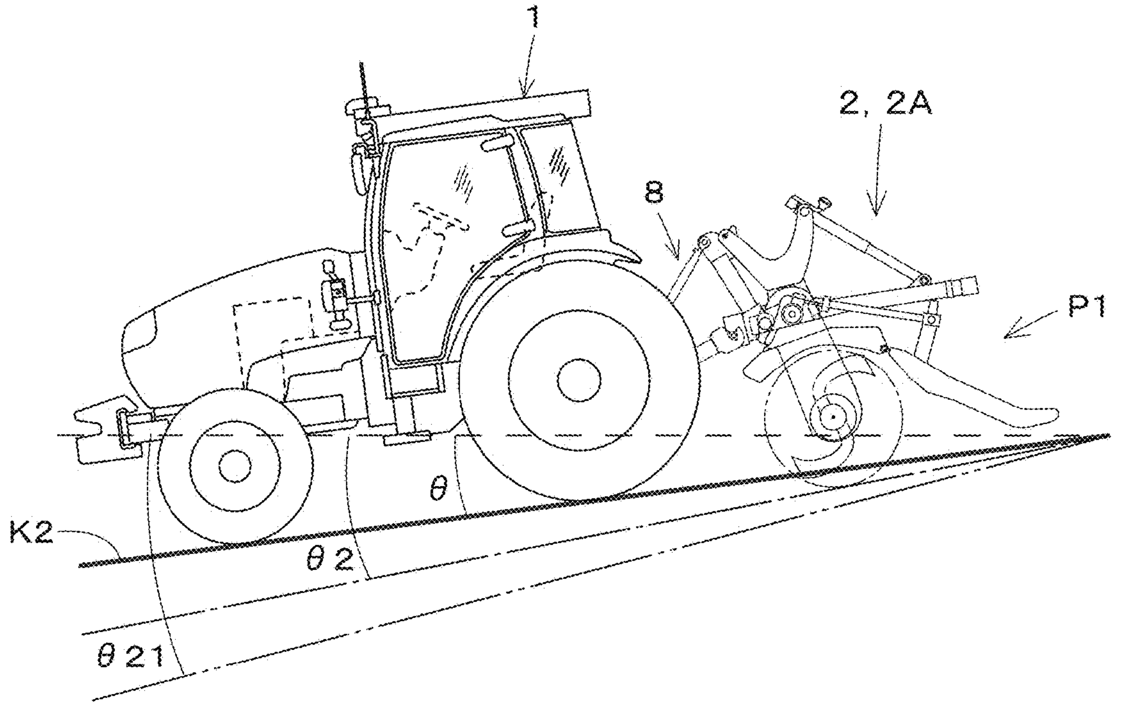
FIG. 25B is a side view of a working vehicle on a downward slope.
Figure 26A:
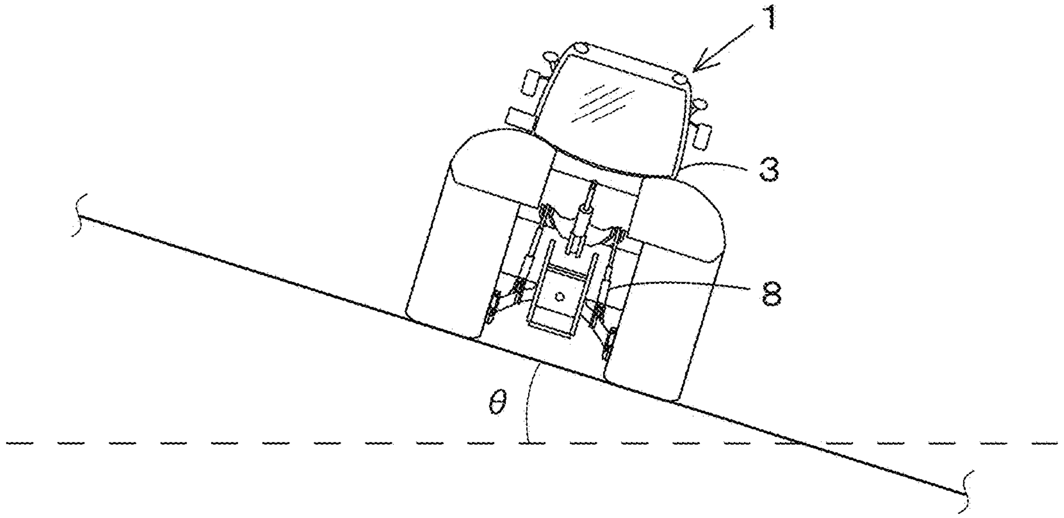
FIG. 26A is a rear view of a working vehicle leaning to the right.
Figure 26B:
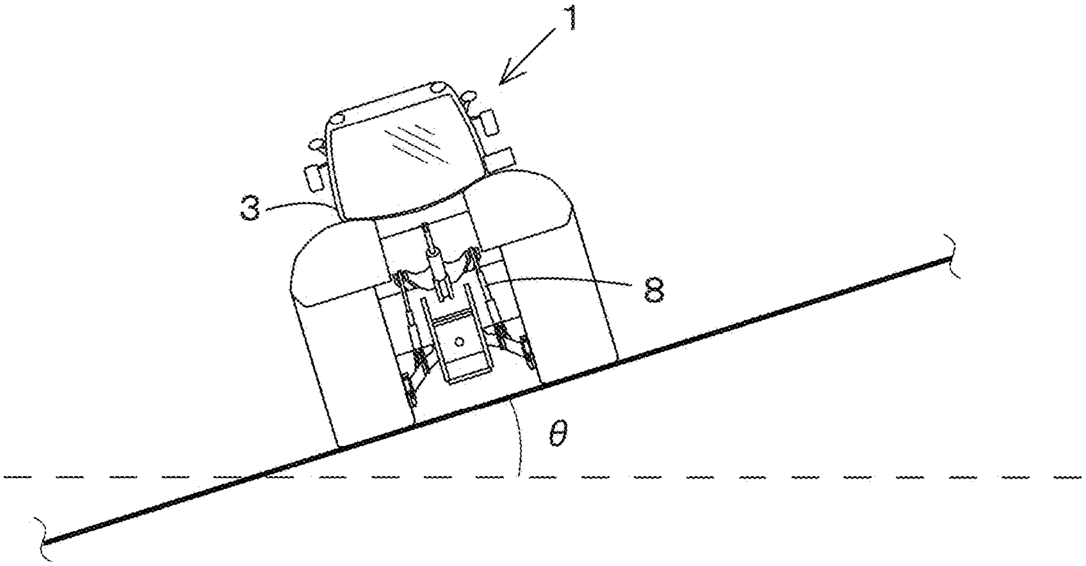
FIG. 26B is a rear view of a working vehicle leaning to the left.

FIG. 25A is a side view of a working vehicle on an upward slope. FIG. 25B is a side view of a working vehicle on a downward slope. FIG. 26A is a rear view of a working vehicle leaning to the right. FIG. 26B is a rear view of a working vehicle leaning to the left.

As a predetermined condition (fifth predetermined condition in FIG. 21), if the working device 2 is tilted in the front-back direction (see FIGS. 25A and 25B), the changer 61*f* changes the second threshold θ2 (to the second threshold θ21, for example) such that the absolute value increases. If the working device 2 is tilted in the left-right direction (see FIGS. 26A and 26B), the changer 61*f* does not change the second threshold θ2.

As a predetermined condition (sixth predetermined condition in FIG. 21), if a remote operator performs an operation to change the second threshold θ2, the changer 61*f* changes the second threshold θ2 (to the second threshold θ21, for example) such that the absolute value increases. If the remote operator performs an operation to restore the second threshold θ2, the changer 61*f* restores the second threshold θ2.

The controller 60 includes the remote-control travel permitter 61*g*. The remote-control travel permitter 61*g* allows the working vehicle 1 in a tilted state to travel under remote operation using the remote controller 90 if the tilt angle θ of the working vehicle 1 is smaller than the second threshold θ2 changed by the changer 61*f*.

For example, the storing device 65 also stores various control programs (such as a setting program, a changing program, and a traveling permission program), and various pieces of data. As a result of executing the setting program, changing program, and traveling permission program stored in the storing device 65, the above-described processor of the controller 60 serves as the setter 61*e*, changer 61*f*, and remote-control travel permitter 61*g*.

When the working vehicle 1 in a tilted state travels under remote operation using the remote controller 90, the limiter 61*d* limits the operation of the working vehicle 1 in the tilted state. FIG. 22 shows examples of limitations on operations of a working vehicle and a working device in the second example embodiment.

The storing device 65 stores limitation data indicating the details of limitations on the operations of the working vehicle 1 and the working device 2 shown in FIG. 22 and association data indicating the association of each limitation with a flag indicating whether the corresponding limitation is applied. If a flag for a certain limitation is ON, this limitation is applied. If a flag for a certain limitation is OFF, this limitation is not applied. As illustrated in FIG. 22, the association data indicates the association between five pieces of limitation data and the flags for these pieces of data. The five pieces of limitation data indicate the limitations on the vehicle speed, acceleration, changing of the speed stage, and steering of the working vehicle 1, and the content of operation of the working device 2.

In the example in FIG. 22, all the flags are ON, and thus, the vehicle speed, acceleration, changing of the speed stage, and steering of the working vehicle 1 in the tilted state, and the content of operation of the working device 2 are all limited. If the flag for the limitation on the speed of the working vehicle 1 is only ON and the other flags are OFF, the speed of the working vehicle 1 is only limited.

The limiter 61*d* limits at least one of the speed, acceleration, changing of the speed stages, and steering of the working vehicle 1 in the tilted state, and the operation of the working device 2. When the limiter 61*d* limits the steering of the working vehicle 1, it limits the steering angle based on the tilt angle θ and the travel direction of the working vehicle 1. More specifically, when the working vehicle 1 is steered under remote operation controlled by the remote controller 90, the limiter 61*d* limits the maximum steering angle for when the working vehicle 1 is steered such that a centrifugal force of the working vehicle 1 acts toward a lower side of the working vehicle 1 on a slope.

In a situation where the right side of the working vehicle 1 is a downward slope and the left side of the working vehicle 1 is an upward slope, as shown in FIG. 24A, when the working vehicle 1 is steered to the left, centrifugal force of the working vehicle 1 acts on the right side of the working vehicle 1, that is, on the side of the downward slope. The limiter 61*d* thus limits the upper limit left steering angle to be a value GR1, which is smaller than the upper limit value GR. Conversely, centrifugal force of the working vehicle 1 does not act on the right side of the working vehicle 1 when the working vehicle 1 is steered to the right, and thus, the limiter 61*d* does not limit the upper limit right steering angle and maintains the upper limit value GL.

In a situation where the right side of the working vehicle 1 is an upward slope and the left side of the working vehicle 1 is a downward slope, as shown in FIG. 24B, when the working vehicle 1 is steered to the right, centrifugal force of the working vehicle 1 acts on the left side of the working vehicle 1, that is, on the side of the downward slope. The limiter 61*d* thus limits the upper limit right steering angle to be a value GL1, which is smaller than the upper limit value GL. Conversely, centrifugal force of the working vehicle 1 does not act on the left side of the working vehicle 1 when the working vehicle 1 is steered to the left, and thus, the limiter 61*d* does not limit the upper limit left steering angle and maintains the upper limit value GR.

FIG. 23 shows examples of details of limitations in the second example embodiment. The storing device 65 stores data indicating the details of limitations shown in FIG. 23.

Specific examples of the details of limitations shown in FIG. 23 are as follows. The limitation on the speed of the working vehicle 1 is to limit the speed to the second prescribed speed v2, for example, which is lower than the first prescribed speed v1. The limitation on the acceleration of the working vehicle 1 is to limit the acceleration to the second prescribed acceleration a2, for example, which is lower than the first prescribed acceleration a1. The limitation on the changing of the speed stages is to maintain the first speed stage. That is, changing from the first speed stage to the second speed stage is not allowed. The limitation on the steering of the working vehicle 1 is to limit the maximum steering angle for when the working vehicle 1 is steered such that the centrifugal force of the working vehicle 1 acts toward a lower side of the working vehicle 1 on a slope. The limitation on the operation of the working device 2 is to prohibit the working device 2 from doing work or to limit the working range of the working device 2.

Figure 20:
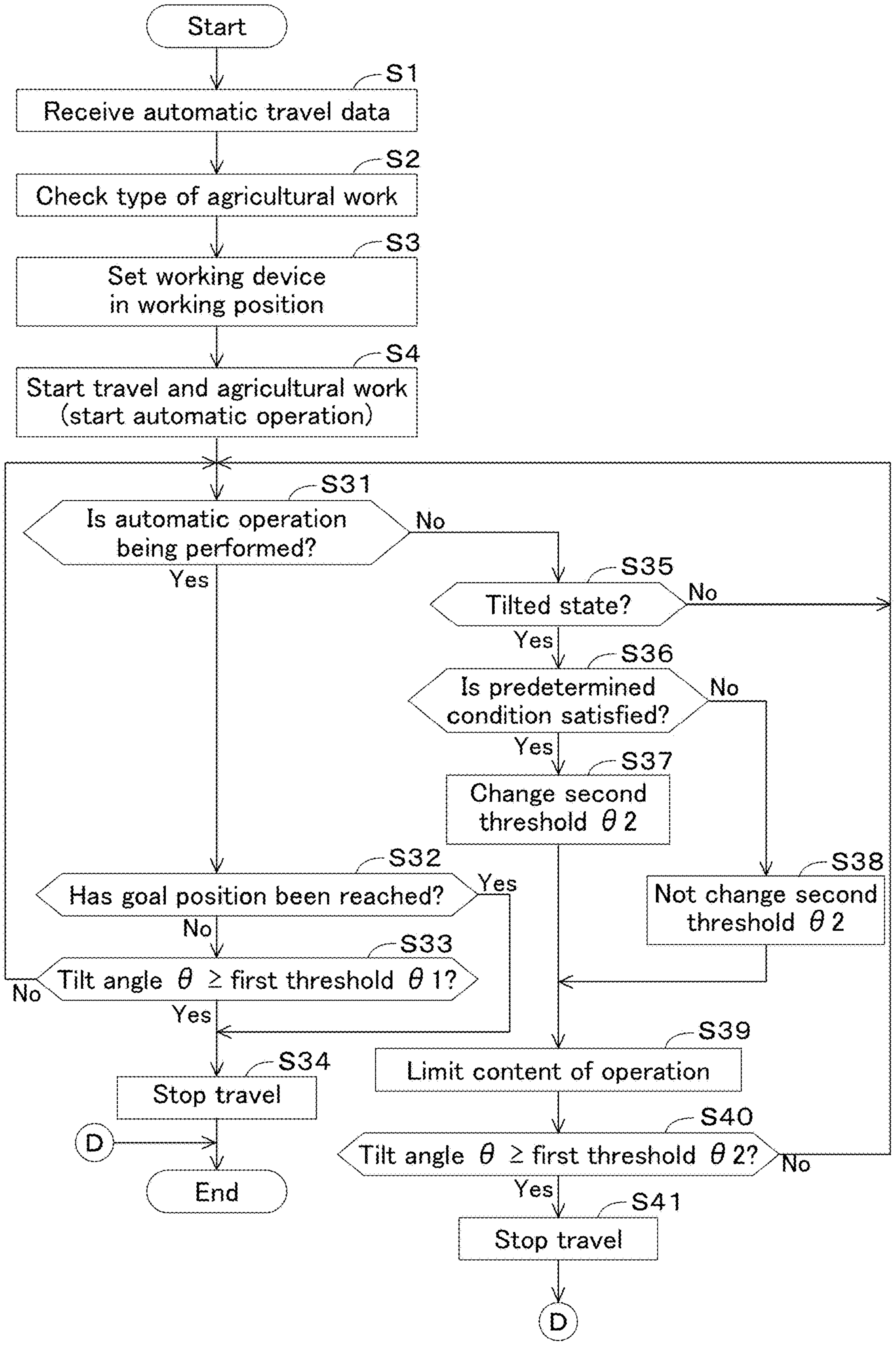
FIG. 20 is a flowchart illustrating an example of the operation of a working vehicle in the second example embodiment.

FIG. 20 is a flowchart illustrating an example of the operation of a working vehicle in the second example embodiment. Steps S1 through S4 in FIG. 20 are the same as those in FIG. 8A, and steps S31 through S41 in FIG. 20 will be explained below.

In step S31, the controller 60 determines whether the working vehicle 1 is traveling under automatic operation. If the controller 60 determines that the working vehicle 1 is traveling under automatic operation (Yes in step S31), it determines in step S32 whether the working vehicle 1 and the working device 2 have reached the goal position Pg (see FIG. 3, for example).

If the working vehicle 1 and the working device 2 have reached the goal position Pg (Yes in step S32), the controller 60 causes the working vehicle 1 to stop traveling and the working device 2 to stop doing agricultural work in step S34 and completes the processing.

If the working vehicle 1 and the working device 2 have not reached the goal position Pg (No in step S32), the controller 60 determines in step S33 whether the tilt angle θ of the working vehicle 1 is larger than or equal to the first threshold θ1.

If the tilt angle θ of the working vehicle 1 is larger than or equal to the first threshold θ1 (Yes in step S33), the controller 60 causes the working vehicle 1 to stop traveling in step S34. In step S34, the controller 60 may also cause the working device 2 to stop doing agricultural work.

If the tilt angle θ of the working vehicle 1 is smaller than the first threshold θ1 (No in step S33), the controller 60 returns to step S31.

If the controller 60 determines that the working vehicle 1 is not traveling under automatic operation (No in step S31), it determines in step S35 whether the working vehicle 1 is in a tilted state. If the working vehicle 1 is not in a tilted state (No in step S35), the controller 60 returns to step S31.

If the controller 60 determines that the working vehicle 1 is in a tilted state (Yes in step S35), it determines in step S36 whether any of the predetermined conditions is satisfied. If the controller 60 determines that a predetermined condition is satisfied (Yes in step S36), it changes the second threshold θ2 in step S37. If the controller 60 determines that none of the predetermined conditions are satisfied (No in step S36), it does not change the second threshold θ2 in step S38.

After step S37 or S38, the limiter 61*d* of the controller 60 limits the operation of the working vehicle 1 in step S39, as shown in FIG. 23.

Then, the controller 60 determines in step S40 whether the tilt angle θ of the working vehicle 1 is larger than or equal to the second threshold θ2. If the tilt angle θ of the working vehicle 1 is larger than or equal to the second threshold θ2 (Yes in step S40), the controller 60 causes the working vehicle 1 to stop traveling in step S41. In step S41, the controller 60 may also cause the working device 2 to stop doing agricultural work.

If the tilt angle θ of the working vehicle 1 is smaller than the second threshold θ2 (No in step S40), the controller 60 returns to step S31.

The major features and advantages of the working vehicle 1 according to the above-described second example embodiment are as follows.

(Item B1) A working vehicle 1 to perform automatic operation including doing work at an agricultural field H using a working device 2, including a setter 61*e* configured or programmed to set a first threshold θ1 for the automatic operation and a second threshold θ2 for remote operation controlled by a remote controller 90, and a controller 60 configured or programmed to cause the working vehicle 1 to stop traveling if a tilt angle θ of the working vehicle 1 reaches the first threshold θ1 during the automatic operation or the second threshold θ2 during the remote operation.

With this configuration, if the working vehicle 1 traveling under the automatic operation enters a tilted state in which the tilt angle θ of the working vehicle 1 reaches the first threshold θ1, the working vehicle 1 stops traveling, making it possible to eliminate or reduce the likelihood that the working vehicle 1 will overturn during the automatic operation. If the working vehicle 1 traveling under the remote operation enters a tilted state in which the tilt angle θ of the working vehicle 1 reaches the second threshold θ2, the working vehicle 1 stops traveling, making it possible to eliminate or reduce the likelihood that the working vehicle 1 will overturn during the remote operation. It is thus possible to achieve good operability while appropriately preventing the overturning of the working vehicle 1 both in the automatic operation and the remote operation.

(Item B2) The working vehicle 1 according to item B1, wherein the second threshold θ2 has a greater absolute value than the first threshold θ1.

With this configuration, it is possible to cause the working vehicle 1 to continue traveling in a more tilted state during the remote operation than during the automatic operation.

(Item B3) The working vehicle 1 according to item B1, wherein the first threshold θ1 has a greater absolute value than the second threshold θ2.

With this configuration, it is possible to cause the working vehicle 1 to continue traveling in a more tilted state during the automatic operation than during the remote operation.

(Item B4) The working vehicle 1 according to item B2, further including a changer 61*f* configured or programmed to change the second threshold θ2 based on a predetermined condition.

With this configuration, the second threshold θ2 for the remote operation is changed based on the predetermined condition. It is thus possible to appropriately adjust the second threshold θ2 for the remote operation, making it possible to flexibly perform the remote operation and also to appropriately eliminate or reduce the likelihood that the working vehicle 1 will overturn during the remote operation.

(Item B5) The working vehicle 1 according to item B3, further including a changer 61*f* configured or programmed to change the first threshold θ1 based on a predetermined condition.

With this configuration, the first threshold θ1 for the automatic operation is changed based on the predetermined condition. It is thus possible to suitably adjust the first threshold θ1 for the automatic operation, making it possible to flexibly perform the automatic operation and also to appropriately eliminate or reduce the likelihood that the working vehicle 1 will overturn during the automatic operation.

(Item B6) The working vehicle 1 according to item B4, further including a remote-control travel permitter 61*g* configured or programmed to permit the working vehicle 1 in a tilted state to travel under the remote operation controlled by the remote controller 90 if the tilt angle θ of the working vehicle 1 is smaller than the changed second threshold θ2 changed by the changer 61*f*.

With this configuration, when the working vehicle 1 has entered a tilted state in which the tilt angle θ of the working vehicle 1 under the automatic operation reaches the first threshold θ1, the working vehicle 1 stops traveling, making it possible to eliminate or reduce the likelihood that the working vehicle 1 will overturn during the automatic operation. That is, it is possible to ensure a configuration that the working vehicle 1 will not overturn during the automatic operation. On the other hand, if it is determined that the tilt angle θ is less than the second threshold having a larger absolute value than the first threshold θ1, it is possible to cause the working vehicle 1 in the tilted state to travel under the remote operation by the remote controller 90. That is, it is possible for the remote operator to cause the working vehicle 1 to travel while checking the tilted state of the working vehicle 1. It is thus possible to prevent or reduce the overturning during the automatic operation, and to allow the working vehicle 1 in the tilted state to travel under the remote operation while ensuring the safety of the working vehicle 1 during the remote operation.

(Item B7) The working vehicle 1 according to item B4 or B6, wherein the predetermined condition include a condition in which, if a received signal strength of a control signal from the remote controller 90 is higher than or equal to a predetermined value, the changer 61*f* changes the second threshold θ2 such that an absolute value of the second threshold θ2 increases, and if the received signal strength of the control signal is lower than the predetermined value, the changer 61*f* does not change the second threshold θ2.

With this configuration, if the received signal strength of a control signal from the remote controller 90 is higher than or equal to the predetermined value, since the remote operator operating the remote controller 90 is positioned near the working vehicle 1 (within a predetermined distance from the working vehicle 1), even if the second threshold θ2 is changed such that the absolute value increases (i.e., even if the second threshold θ2 is changed to have a greater value, in other words, even if the second threshold θ2 is changed to a less strict second threshold θ21), it is possible for the remote operator to cause the working vehicle 1 in the tilted state to travel while confirming safety. On the other hand, if the received signal strength of a control signal from the remote controller 90 is lower than the predetermined value, since the remote operator is far away from the working vehicle 1 (outside the predetermined distance from the working vehicle 1), the remote operator cannot confirm safety sufficiently. Therefore, the second threshold θ2 is not changed (that is, the second threshold θ2 is not changed to a less strict one). It is thus possible to maintain the condition based on which the working vehicle 1 in the tilted state is stopped. This makes it possible to ensure that the remote operator is performing operations near the working vehicle 1, making it possible to ensure the safety of the travel of the working vehicle 1 in the tilted state.

(Item B8) The working vehicle 1 according to item B4, B6, or B7, wherein the predetermined condition includes a condition in which, if the remote controller 90 is positioned within a predetermined range from the working vehicle 1, the changer 61*f* changes the second threshold θ2 such that an absolute value of the second threshold θ2 increases, and if the remote controller 90 is positioned outside the predetermined range from the working vehicle 1, the changer 61*f* does not change the second threshold θ2.

With this configuration, if the remote controller 90 is positioned within the predetermined range (first range r1 in FIG. 7B) from the working vehicle 1, since the remote operator operating the remote controller 90 is positioned near the working vehicle 1 (within the predetermined range from the working vehicle 1), even if the second threshold θ2 is changed such that the absolute value increases (i.e., even if the second threshold θ2 is changed to have a greater value, in other words, even if the second threshold θ2 is changed to a less strict second threshold θ21), the remote operator can cause the working vehicle 1 in the tilted state to travel while confirming safety. On the other hand, if the remote controller 90 is positioned in a range (second range r2 in FIG. 7B) outside the predetermined range from the working vehicle 1, since the remote operator is far away from the working vehicle 1 (outside the predetermined range from the working vehicle 1), the remote operator is unable to confirm sufficient safety, and therefore the second threshold θ2 is not changed (i.e., the second threshold θ2 is not changed to a less strict one). It is thus possible to maintain the condition based on which the working vehicle 1 in the tilted state is stopped. This makes it possible to ensure that the remote operator is performing operations near the working vehicle 1, making it possible to ensure the safety of the travel of the working vehicle 1 in the tilted state.

(Item B9) The working vehicle 1 according to item B8, wherein the predetermined condition includes a condition in which, if the remote controller 90 is positioned within the predetermined range from the working vehicle 1 and is located higher than the working vehicle 1 on a slope, the changer 61*f* changes the second threshold θ2 such that an absolute value of the second threshold θ2 increases, and if the remote controller 90 is positioned within the predetermined range from the working vehicle 1 and is located lower than the working vehicle 1 on a slope, the changer 61*f* does not change the second threshold θ2.

With this configuration, if the remote controller 90 is positioned within the predetermined range from the working vehicle 1 and is located higher than the working vehicle 1 on a slope, since the remote operator operating the remote controller 90 is positioned near the working vehicle 1 (located at a position within the predetermined range from the working vehicle 1 and higher than the working vehicle 1 on a slope), even if the second threshold θ2 is changed such that the absolute value increases (i.e., even if the second threshold θ2 is changed to have a greater value, in other words, even if the second threshold θ2 is changed to a less strict second threshold θ21), the remote operator can cause the working vehicle 1 in the tilted state to travel while confirming safety and can also reliably ensure their own safety. On the other hand, if the remote controller 90 is within the predetermined range from the working vehicle 1 but is located lower than the working vehicle 1 on a slope, the remote operator cannot ensure their own safety, and therefore the second threshold θ2 is not changed (that is, the second threshold θ2 is not changed to a less strict one). It is thus possible to maintain the condition based on which the working vehicle 1 in the tilted state is stopped. This makes it possible to ensure that the remote operator is performing operations near the working vehicle 1, making it possible to ensure the safety of the travel of the working vehicle 1 in the tilted state and also ensure the safety of the remote operator.

(Item B10) The working vehicle 1 according to any one of items B4 and B6 to B9, wherein the changer 61*f* is configured or programmed to change the second threshold θ2 based on a type of the working device 2 as the predetermined condition.

With this configuration, the second threshold θ2 is changed in accordance with the type of working device 2. This makes it possible to eliminate or reduce the likelihood that the working vehicle 1 will overturn, in consideration of the working device 2.

(Item B11) The working vehicle 1 according to item B10, wherein the predetermined condition includes a condition in which, if the type of the working device 2 is a contact type that does work by contacting a ground, the changer 61*f* changes the second threshold θ2 such that an absolute value of the second threshold θ2 increases, and if the type of the working device 2 is a noncontact type that does work without contacting the ground, the changer 61*f* does not change the second threshold θ2.

With this configuration, the following is achieved. With regard to a working device 2 of a contact type that does work by contacting the ground, since the working vehicle 1 having such a working device 2 of a contact type attached thereto is more stable in posture than the working vehicle 1 having a working device 2 of a noncontact type attached thereto, the second threshold θ2 can be changed such that the absolute value increases (i.e., the second threshold θ2 can be changed to have a greater value, in other words, the second threshold θ2 can be changed to a less strict second threshold θ21), making it possible to ensure the safety of the travel of the working vehicle 1 in the tilted state.

(Item B12) The working vehicle 1 according to item B10, wherein the predetermined condition includes a condition in which, if the type of the working device 2 is a traveling type including one or more wheels or one or more crawlers, the changer 61*f* changes the second threshold θ2 such that an absolute value of the second threshold θ2 increases, and if the type of the working device 2 is a separation type that has a center of gravity higher than a predetermined position and that does not contact a ground, the changer 61*f* does not change the second threshold θ2.

With this configuration, the following is achieved. With regard to a working device 2 of a traveling type including wheels or crawlers, since the working vehicle 1 having such a working device 2 of a traveling type attached thereto is more stable in posture than the working vehicle 1 having a working device 2 of a separation type attached thereto, the second threshold θ2 can be changed such that the absolute value increases (i.e., the second threshold θ2 can be changed to have a greater value, in other words, the second threshold θ2 can be changed to a less strict second threshold θ21), making it possible to ensure the safety of the travel of the working vehicle 1 in the tilted state.

(Item B13) The working vehicle 1 according to any one of items B4 and B6 to B12, wherein the predetermined condition includes a condition in which, if the working device 2 is tilted in a front-back direction, the changer 61*f* changes the second threshold θ2 such that an absolute value of the second threshold θ2 increases, and if the working device 2 is tilted in a left-right direction, the changer 61*f* does not change the second threshold θ2.

With this configuration, the following is achieved. When the working device 2 is tilted in the front-back direction, this is less likely to lead to overturning. Therefore, the second threshold θ2 can be changed such that the absolute value increases (that is, the second threshold θ2 can be changed to have a greater value, in other words, the second threshold θ2 can be changed to a less strict second threshold θ21). On the other hand, when the working device 2 is tilted in the left-right direction, this is more likely to lead to overturning than when the working device 2 is tilted in the front-back direction. Therefore, the second threshold θ2 is not changed (that is, the second threshold θ2 is not changed to a less strict one). This makes it possible to maintain the condition on which the working vehicle 1 in the tilted state is stopped. It is thus possible to ensure the safety of the travel of the working vehicle 1 in the tilted state.

(Item B14) The working vehicle 1 according to any one of items B1 to B13, further including a limiter 61*d* configured or programmed to limit content of an operation of the working vehicle 1 in a tilted state when the working vehicle 1 travels in the tilted state under the remote operation controlled by the remote controller 90.

With this configuration, the content of the operation of the working vehicle 1 in the tilted state is limited, making it possible to allow the working vehicle 1 in the tilted state to travel more safely under the remote operation controlled by the remote controller 90.

(Item B15) The working vehicle 1 according to item B14, wherein the limiter 61*d* is configured or programmed to limit at least one of a vehicle speed of the working vehicle 1 in the tilted state, an acceleration of the working vehicle 1 in the tilted state, changing a speed stage of the working vehicle 1 in the tilted state, steering of the working vehicle 1 in the tilted state, or content of an operation of the working device 2.

With this configuration, when the working vehicle 1 is in the tilted state, at least one of the vehicle speed of the working vehicle 1, the acceleration of the working vehicle 1, changing the speed stage of the working vehicle 1, the steering of the working vehicle 1, or the content of the operation of the working device 2 is limited. It is thus possible to ensure the safety of the travel of the working vehicle 1 in the tilted state.

(Item B16) The working vehicle 1 according to item B15, wherein the limiter 61*d* is configured or programmed to, when limiting the steering of the working vehicle 1, limit a steering angle of the steering based on the tilt angle θ of the working vehicle 1 and a travel direction of the working vehicle 1.

With this configuration, the steering angle is limited based on the tilt angle θ and the travel direction of the working vehicle 1, making it possible to safely steer the working vehicle 1 in the tilted state.

(Item B17) The working vehicle 1 according to item B16, wherein the limiter 61*d* is configured or programmed to, when the working vehicle 1 is steered under the remote operation controlled by the remote controller 90, limit a maximum steering angle for when the working vehicle 1 is steered such that a centrifugal force of the working vehicle 1 acts toward a lower side of the working vehicle 1 on a slope.

With this configuration, the maximum steering angle is limited when the working vehicle 1 is steered such that the centrifugal force of the working vehicle 1 acts toward the lower side of the working vehicle 1 on a slope (downward slope), making it possible to eliminate or reduce the likelihood that the working vehicle 1 will overturn due to the centrifugal force.

(Item B18) The working vehicle 1 according to any one of items B4 and B6 to B17, wherein the predetermined condition includes a condition in which, if a remote operator performs an operation to change the second threshold θ2, the changer 61*f* changes the second threshold θ2 such that an absolute value of the second threshold θ2 increases, and if the remote operator performs an operation to restore the second threshold θ2, the changer 61*f* restore the second threshold θ2.

With this configuration, when the remote operator performs an operation to change the second threshold θ2, the second threshold θ2 is changed such that the absolute value increases (i.e., the second threshold θ2 is changed to have a greater value, in other words, the second threshold θ2 is changed to a less strict second threshold θ21). The second threshold θ2 can thus be appropriately changed. When the remote operator performs an operation to revert the change, the changed second threshold is returned to the original second threshold θ2. The changed second threshold can thus be appropriately returned to the second threshold θ2.

In the above-described first and second example embodiments and first variation, the remote controller 90 is a remote control, for example, but the remote controller 90 is not limited thereto. For example, the remote controller 90 may be a tablet terminal or a smartphone. The mobile terminal 50 may also function as the remote controller 90.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle to perform automatic operation including doing work at an agricultural field using a working device, the working vehicle comprising:

a controller including an electrical/electronic circuit, a processor, and a memory, and configured or programmed to define and function as:
  - a setter configured or programmed to set a first threshold for the automatic operation and a second threshold for remote operation controlled by a remote controller; and
  - a changer configured or programmed to change the second threshold based on a predetermined condition; wherein the controller is configured or programmed to cause the working vehicle to stop traveling if a tilt angle of the working vehicle reaches the first threshold during the automatic operation or the second threshold during the remote operation;

the second threshold has a greater absolute value than the first threshold; and the predetermined condition includes a condition in which, if a received signal strength of a control signal from the remote controller is higher than or equal to a predetermined value, the changer changes the second threshold such that an absolute value of the second threshold increases, and if the received signal strength of the control signal is lower than the predetermined value, the changer does not change the second threshold.

2. The working vehicle according to claim 1, wherein the changer is configured or programmed to change the first threshold based on a predetermined condition.

3. The working vehicle according to claim 1, wherein the changer is configured or programmed to change the second threshold based on a type of the working device as the predetermined condition.

4. The working vehicle according to claim 3, wherein the predetermined condition includes a condition in which, if the type of the working device is a traveling type including one or more wheels or one or more crawlers, the changer changes the second threshold such that an absolute value of the second threshold increases, and if the type of the working device is a separation type that is not the traveling type and that has a center of gravity higher than a predetermined position and that does not contact a ground, the changer does not change the second threshold.

5. The working vehicle according to claim 1, wherein the predetermined condition includes a condition in which, if the working device is tilted in a front-back direction, the changer changes the second threshold such that an absolute value of the second threshold increases, and if the working device is tilted in a left-right direction, the changer does not change the second threshold.

6. A working vehicle to perform automatic operation including doing work at an agricultural field using a working device, the working vehicle comprising:

a controller including an electrical/electronic circuit, a processor, and a memory, and configured or programmed to define and function as:
  - a setter configured or programmed to set a first threshold for the automatic operation and a second threshold for remote operation controlled by a remote controller; and
  - a changer configured or programmed to change the second threshold based on a predetermined condition; wherein the controller is configured or programmed to cause the working vehicle to stop traveling if a tilt angle of the working vehicle reaches the first threshold during the automatic operation or the second threshold during the remote operation;

the second threshold has a greater absolute value than the first threshold; and the predetermined condition includes a condition in which, if the remote controller is positioned within a predetermined range from the working vehicle, the changer changes the second threshold such that an absolute value of the second threshold increases, and if the remote controller is positioned outside the predetermined range from the working vehicle, the changer does not change the second threshold.

7. The working vehicle according to claim 6, wherein the predetermined condition includes a condition in which, if the remote controller is positioned within the predetermined range from the working vehicle and is located higher than the working vehicle on a slope, the changer changes the second threshold such that an absolute value of the second threshold increases, and if the remote controller is positioned within the predetermined range from the working vehicle and is located lower than the working vehicle on a slope, the changer does not change the second threshold.

8. A working vehicle to perform automatic operation including doing work at an agricultural field using a working device, the working vehicle comprising:

a controller including an electrical/electronic circuit, a processor, and a memory, and configured or programmed to define and function as:

a setter configured or programmed to set a first threshold for the automatic operation and a second threshold for remote operation controlled by a remote controller; and a changer configured or programmed to change the second threshold based on a predetermined condition; wherein the controller is configured or programmed to cause the working vehicle to stop traveling if a tilt angle of the working vehicle reaches the first threshold during the automatic operation or the second threshold during the remote operation;

the second threshold has a greater absolute value than the first threshold;

the changer is configured or programmed to change the second threshold based on a type of the working device as the predetermined condition; and the predetermined condition includes a condition in which, if the type of the working device is a contact type that does work by contacting a ground, the changer changes the second threshold such that an absolute value of the second threshold increases, and if the type of the working device is a noncontact type that does work without contacting the ground, the changer does not change the second threshold.

9. A working vehicle to perform automatic operation including doing work at an agricultural field using a working device, the working vehicle comprising:

a controller including an electrical/electronic circuit, a processor, and a memory, and configured or programmed to define and function as:

a setter configured or programmed to set a first threshold for the automatic operation and a second threshold for remote operation controlled by a remote controller; and a limiter configured or programmed to limit content of an operation of the working vehicle in a tilted state when the working vehicle travels in the tilted state under the remote operation controlled by the remote controller; wherein the controller is configured or programmed to cause the working vehicle to stop traveling if a tilt angle of the working vehicle reaches the first threshold during the automatic operation or the second threshold during the remote operation;

the limiter is configured or programmed to limit at least one of a vehicle speed of the working vehicle in the tilted state, an acceleration of the working vehicle in the tilted state, changing a speed stage of the working vehicle in the tilted state, steering of the working vehicle in the tilted state, or content of an operation of the working device; and the limiter is configured or programmed to, when limiting the steering of the working vehicle, limit a steering angle of the steering based on the tilt angle of the working vehicle and a travel direction of the working vehicle.

10. The working vehicle according to claim 9, wherein the limiter is configured or programmed to, when the working vehicle is steered under the remote operation controlled by the remote controller, limit a maximum steering angle for when the working vehicle is steered such that a centrifugal force of the working vehicle acts toward a lower side of the working vehicle on a slope.

11. A working vehicle to perform automatic operation including doing work at an agricultural field using a working device, the working vehicle comprising:

a controller including an electrical/electronic circuit, a processor, and a memory, and configured or programmed to define and function as:

a setter configured or programmed to set a first threshold for the automatic operation and a second threshold for remote operation controlled by a remote controller; and a changer configured or programmed to change the second threshold based on a predetermined condition; wherein the controller is configured or programmed to cause the working vehicle to stop traveling if a tilt angle of the working vehicle reaches the first threshold during the automatic operation or the second threshold during the remote operation;

the second threshold has a greater absolute value than the first threshold; and the predetermined condition includes a condition in which, if a remote operator performs an operation to change the second threshold, the changer changes the second threshold such that an absolute value of the second threshold increases, and if the remote operator performs an operation to restore the second threshold, the changer restores the second threshold.

* * * * *